US006909814B1

(12) United States Patent
Nakajima

(10) Patent No.: US 6,909,814 B1
(45) Date of Patent: Jun. 21, 2005

(54) IMAGE PROCESSING METHOD OF GENERATING CONVERSION DATA FOR A SCANNER AND CALIBRATION METHOD EMPLOYING THE SCANNER

(75) Inventor: Nobuyuki Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 900 days.

(21) Appl. No.: 09/661,151

(22) Filed: Sep. 13, 2000

(30) Foreign Application Priority Data

Sep. 17, 1999 (JP) ............................................. 11-263920
Sep. 17, 1999 (JP) ............................................. 11-264634

(51) Int. Cl.[7] ......................... H04N 1/104; H04N 1/46; G06K 9/40
(52) U.S. Cl. ........................ 382/274; 358/474; 358/509
(58) Field of Search ............................... 382/274, 312; 358/1.9, 520, 509, 475, 474

(56) References Cited

U.S. PATENT DOCUMENTS 5,537,516 A * 7/1996 Sherman ..................... 395/101

| 5,583,644 A | 12/1996 | Sasanuma et al. .......... 358/296 |
| 6,034,788 A | 3/2000 | Sasanuma et al. .......... 358/406 |
| 6,671,067 B1 * | 12/2003 | Adam ........................ 358/1.6 |

FOREIGN PATENT DOCUMENTS

| JP | 87216494 | 9/1987 | ............ H04N/1/40 |
| JP | 8-289166 | 11/1996 | ............ H04N/1/48 |
| JP | 2643951 | 5/1997 | .......... H04N/1/407 |
| JP | 11-120337 | 11/1999 | ............ H04N/1/46 |

* cited by examiner

*Primary Examiner*—Jerome Grant
(74) *Attorney, Agent, or Firm*—Fitzpatrick, Cella, Harper & Scinto

(57) ABSTRACT

A calibration for a scanner, which is used as a densitometer, is carried out always with high accuracy. More specifically, an image processing method of generating a conversion condition for a scanner which is used for reading an image and generating image data, is provided. The method including the steps of: obtaining a reading property of an object scanner based on image data obtained by that the object scanner reads a chart, and generating the conversion condition for the object scanner based on the reading property of the object scanner, a previously prepared reading property of a standard scanner and a previously prepared brightness-density conversion condition for the standard scanner.

15 Claims, 24 Drawing Sheets

| FIG.4A |
| FIG.4B |

| FIG.8A |
|--------|
| FIG.8B |

| ARRAY | ACTUAL OUTPUT DATA | ARRAY | ACTUAL OUTPUT DATA |
|---|---|---|---|
| 0 | 0 | 41 | 164 |
| 1 | 4 | 42 | 168 |
| 2 | 8 | 43 | 172 |
| 3 | 12 | 44 | 176 |
| 4 | 16 | 45 | 180 |
| 5 | 20 | 46 | 184 |
| 6 | 24 | 47 | 188 |
| 7 | 28 | 48 | 192 |
| 8 | 32 | 49 | 196 |
| 9 | 36 | 50 | 200 |
| 10 | 40 | 51 | 204 |
| 11 | 44 | 52 | 208 |
| 12 | 48 | 53 | 212 |
| 13 | 52 | 54 | 216 |
| 14 | 56 | 55 | 220 |
| 15 | 60 | 56 | 224 |
| 16 | 64 | 57 | 228 |
| 17 | 68 | 58 | 232 |
| 18 | 72 | 59 | 236 |
| 19 | 76 | 60 | 240 |
| 20 | 80 | 61 | 244 |
| 21 | 84 | 62 | 248 |
| 22 | 88 | 63 | 255 |
| 23 | 92 | | |
| 24 | 96 | | |
| 25 | 100 | | |
| 26 | 104 | | |
| 27 | 108 | | |
| 28 | 112 | | |
| 29 | 116 | | |
| 30 | 120 | | |
| 31 | 124 | | |
| 32 | 128 | | |
| 33 | 132 | | |
| 34 | 136 | | |
| 35 | 140 | | |
| 36 | 144 | | |
| 37 | 148 | | |
| 38 | 152 | | |
| 39 | 156 | | |
| 40 | 160 | | |

FIG.9

IMAGE PROCESSING METHOD OF GENERATING CONVERSION DATA FOR A SCANNER AND CALIBRATION METHOD EMPLOYING THE SCANNER

This application is based on Japanese Patent Application Nos. 11-(263920 and 11-(264634 both filed Sep. 17, 1999, the content of which is incorporated hereinto by reference.

BACKGROUND OF THE INVENTION

1. Field of the Invention

The present invention relates to an image processing method of generating conversion data for a scanner, and to a calibration method of calibrating a printing apparatus by means of the scanner.

2. Description of the Prior Art

It is generally known that a printing property of a printing apparatus may vary according to a surrounding condition such as a temperature and a humidity of a surrounding air, in which the printing apparatus is used. Not only the surrounding condition but also use of the printing apparatus for a certain period of time may cause the printing property to vary. In a case of electrophotographic printing apparatus, for instance, a photosensitive property of a photosensitive drum changes according to the surrounding condition and to aging by the use of the apparatus. As a result, the printing property e.g. a gradation in density observed in a printed image changes from what is desired. It is also known that in a case of an ink-jet printing apparatus, the above-mentioned printing property change is caused by a change in ejection property of a print head, for instance.

A calibration is carried out to deal with such change in the printing property but is not carried only for the change in printing property of an individual printing apparatus as described above. In a case of an information processing system in which a plurality of printing apparatuses are connected with one another through a network, difference in the printing property among the plurality of printing apparatus may present a problem. Thus, also in such a case, it is necessary to conduct the calibration to reduce the printing property variations among the printing apparatus.

A conventional calibration is basically carried out based on the user's instruction input. For example, when the user observes that the gradation in the printed image is not what is desired, the user gives an instruction to execute the calibration on an operation picture of a display and others of the printing apparatus or a personal computer (hereinafter also referred as a PC).

In order to carry out the calibration, the user causes the printing apparatus to print a predetermined chart in which patches of a plurality of density for each color are disposed, and causes a densitometer, a scanner or others to read the printed chart. Then, based on read data, the user makes, for example, contents of a density correction table used in the image processing for generating printing data renewed. Accordingly, in order to carry out the calibration of the printing apparatus with high accuracy, it is also important to read the chart printed by the printing apparatus correctly.

As a device for reading the chart, there is known the densitometer. The densitometer gives so-called device-independent data such as CIE-1931XYZ color system data, L*a*b* system data or the like (hereinafter the data is called "density") as a result of measuring the chart. This allows the density obtained by measuring the chart to correctly reflect the printing property of the printing apparatus which prints the chart, irrespective of the device used for measurement. The densitometer, however, is relatively expensive; it is not realistic to supply a printer with an expensive densitometer as peripheral equipment, or to make the user purchase the densitometer separately in order to calibrate a low-price printer.

On the other hand, in order to read the chart, a scanner which is a device to input an image and others, or a reading portion of a copying machine have been used, conventionally. However, it is difficult to use the scanner and others as a highly accurate device for reading the chart, as the densitometer. This is because conventionally a calibration for the scanner and others has not been done so as to be able to conduct the highly accurate density measurement. More specifically, it is relatively difficult to generate a table for converting brightness data obtained by the scanner into the density (hereinafter the conversion is called "brightness-density conversion") with high accuracy.

In addition, when the calibration of the scanner and others can not be carried out with high accuracy, different types of scanners and others may become to have different properties. Then, when such scanners are used for the calibration of the printer, different colors may be reproduced among printers.

SUMMARY OF THE INVENTION

An object of the present invention is to make it possible to carry out a calibration of reading means such as a scanner, which is used as a densitometer, always with high accuracy.

Another object of the present invention is to make it possible to generate dynamically a brightness-density conversion table for the reading means in the calibration of the reading means so that not only a fixed type of apparatus but all types of apparatus may be employed as the reading means.

Still another object of the present invention is to reduce a load owed by a user, which is required for the calibration of the reading means as much as possible.

In the first aspect of the present invention, there is provided an image processing method of generating a conversion condition for a scanner which is used for reading an image and generating image data, the method comprising the steps of:

obtaining a reading property of an object scanner based on image data obtained by that the object scanner reads a chart; and generating the conversion condition for the object scanner based on the reading property of the object scanner, a previously prepared reading property of a standard scanner and a previously prepared brightness-density conversion condition for the standard scanner.

In a second aspect of the present invention, there is provided an image processing method of generating a correction condition for a scanner used when calibrating a correction condition for image forming means; the method comprising the steps of:

holding a correction condition for a standard scanner;

judging as to whether the scanner used for calibration is the standard scanner or not;

executing generation of the correction condition for the scanner when the scanner is not judged to be the standard scanner; and not executing generation of the correction condition for the scanner when the scanner is judged to be the standard scanner.

In a third aspect of the present invention, there is provided an image processing apparatus for generating a conversion condition for a scanner which is used for reading an image and generating image data, the apparatus comprising:

means for obtaining a reading property of an object scanner based on image data obtained by that the object scanner reads a chart; and generating means for generating the conversion condition for the object scanner based on the reading property of the object scanner, a previously prepared reading property of a standard scanner and a previously prepared brightness-density conversion condition for the standard scanner.

In a fourth aspect of the present invention, there is provided an image processing apparatus comprising:

generating means for generating a correction condition for a scanner used when calibrating a correction condition for image forming means;

holding means for holding a correction condition for a standard scanner; and judging means for judging as to whether the scanner used for calibration is the standard scanner or not;

wherein the generating means executes generation of the correction condition for the scanner when the scanner is not judged to be the standard scanner, and the generating means does not execute generation of the correction condition for the scanner when the scanner is judged to be the standard scanner.

In a fifth aspect of the present invention, there is provided a calibration method of performing a calibration for a printing apparatus, the method comprising the steps of:

preparing a reading device for reading a predetermined image printed by the printing apparatus;

executing the calibration by renewing brightness-density conversion data obtained based on a reading property of the reading device, a previously prepared predetermined reading property and a previously prepared brightness-density conversion condition corresponding to the predetermined reading property; and measuring density of the predetermined image by means of the reading device which has been subject to calibration by the calibration step; and generating calibration data for the calibration for the printing apparatus based on a result of measurement in the measuring step.

In a sixth aspect of the present invention, there is provided an information processing apparatus for performing a calibration for a printing apparatus, the apparatus comprising:

reading control means for controlling a reading device for reading a predetermined image printed by the printing apparatus;

executing means for executing the calibration by renewing brightness-density conversion data obtained based on a reading property of the reading device, a previously prepared predetermined reading property and a previously prepared brightness-density conversion condition corresponding to the predetermined reading property; and generating means for generating calibration data for the calibration for the printing apparatus based on a density measurement result measured by, under the control of the reading control means, the reading device which has been subject to calibration by the executing means.

The above and other objects, features and advantages of the present invention will become more apparent from the following description of embodiments thereof taken in conjunction with the accompanying drawings.

BRIEF DESCRIPTION OF THE DRAWINGS

FIG. 4 is a diagram showing a relationship of FIGS. 4A and 4B; FIGS. 4A and 4B are diagrams showing reading charts used for the generation of the brightness-density conversion table for the scanner;

FIG. 8 is a diagram showing a relationship of FIGS. 8A and 8B; FIGS. 8A and 8B are diagrams showing charts used in the printer calibration;

FIG. 9 is a diagram showing a relation between an arrangement of data sections in the chart and gradation values;

DETAILED DESCRIPTION OF THE PREFERRED EMBODIMENTS

Embodiments of the present invention will be described in detail below with reference to the attached drawings.

In the embodiments described below, a Color Laser Beam Printer (LBP) is used as an example of a printing apparatus constituting a system, but needless to say, the present invention can be applied to other printing apparatuses such as a Color Ink Jet Printer.

<First Embodiment>

Figure 1:
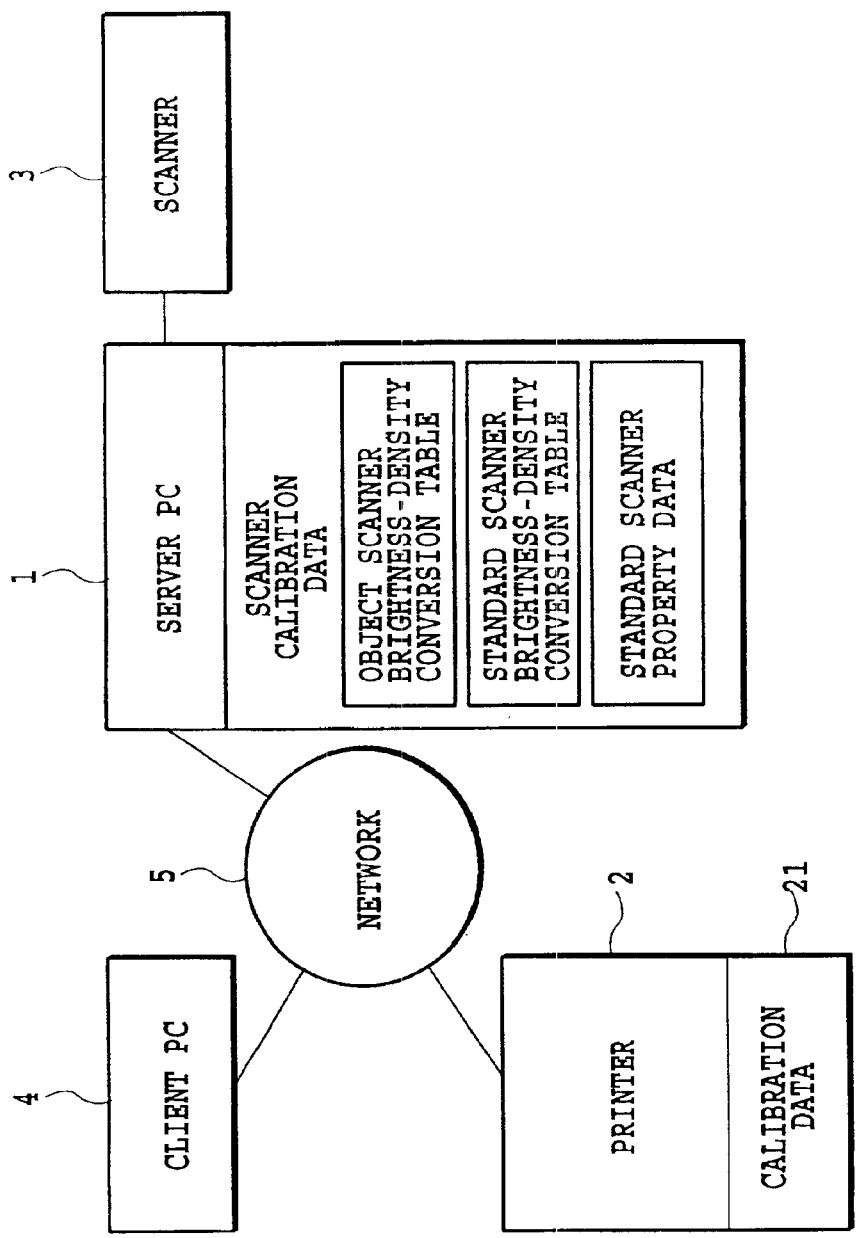
FIG. 1 is a block diagram showing a configuration of a print system according to a first embodiment of the present invention.

FIG. 1 is a block diagram showing a configuration of a print system according to a first embodiment of the present invention.

Although in this example a connection form and a protocol in a network as shown in FIG. 1 are not referred to in detail, the present invention may be applied to any connection form or protocol.

The numeral 1 represents a server PC (Personal Computer), in which software for realizing the system of the embodiment is installed. The server PC 1 is connected to a network 5.

The numeral 11 represents a scanner calibration data storing section, which is provided in the server PC 1 to store scanner calibration data described below. The numeral 111, within the scanner calibration data storing section 11, represents an object scanner brightness-density conversion table storing section for storing a brightness-density conversion table, which is provided for a scanner which a user employs in this print system (hereinafter "object scanner") and which is used upon inputting data read by the object scanner. The numeral 112, within the scanner calibration data storing section 11, represents a standard scanner brightness-density conversion table storing section which stores a brightness-density conversion table for a standard scanner made in advance, for example, in a manufacturing stage of this system. The numeral 113, within the scanner calibration data storing section 11, represents a standard scanner property data storing section which stores property data of the standard scanner obtained by that the standard scanner reads a scanner chart in advance. In a scanner calibration described later, newly obtained other information as well as the data previously prepared in the standard scanner brightness-density conversion table storing section 112 and the standard scanner property data storing section 113 are made used together, so that the data in the object scanner brightness-density conversion table storing section 111 is generated finally.

The numeral 2 represents a printer connected to the network 5, which is an apparatus subject to a printer calibration in the system. The printer 2 is constituted so as to be able to print in accordance with an instruction from each of a plurality of PCs connected through the network. The numeral 21 represents a calibration data storing section constituted inside the printer 2, which is used to store printer calibration data described later on downloading the printer calibration data from the PC 1 into the printer 2.

The numeral 3 represents a scanner connected to the server PC 1, which can be used as a densitometer and measures optical density of patches output by the printer 2, by that the scanner calibration described later in the system is executed. The scanner 3 may be also used for an original purpose, for example, in order toread and input an original document or image. That is, the scanner 3 is the object scanner connected to the system, and when each patch of the chart output by the printer is measured at a process of the printer calibration, the scanner 3 is calibrated by the server PC 1 so as to be able to measure the density stably. More specifically, the scanner calibration data is generated and stored in the object scanner brightness-density conversion table storing section 111 in the scanner calibration data storing section 11. The numeral 4 represents a client PC connected through the network, which generates and edits desired print data, gives an instruction to print the data, and the like. In general, the printer calibration is conducted by a system manager through the server PC 1, while the printing of usual print data is executed by the client PC 4.

A calibration for the object scanner in the above-described print system will be described below. The scanner 3 as the object scanner either is possessed by the user or can be used in the system, and is an all-purpose scanner which can be used for any printer which the user possesses or can be employed for the system. Then, the scanner 3 is calibrated so as to be able to be used as the densitometer capable of reading the chart with high accuracy at a calibration process for the printer 2, which is a process executed as an primary purpose to calibrate printing characteristic of the printer 2 in the print system. Concretely, an object scanner brightness-density conversion table is generated.

Now the generation of the brightness-density conversion table for the scanner 3 will be described with reference to FIGS. 2–6.

In this embodiment, when each patch density of the scanner chart is measured, in order to measure the density of a C patch, R data generated by the scanner 3 is used, in order to measure the density of an M patch, G data is used, in order to measure the density of a Y patch, B data is used, and in order to measure the density of a K patch, G data is used respectively. Accordingly, the brightness-density conversion table for the scanner 3 is, for each of C, M, Y, K, generated as a correspondence relation between the respective values of R, G, B brightness data corresponding to each of C, M, Y, K patches and density information in the standard scanner brightness-density conversion table shown in FIG. 1.

Figure 2:
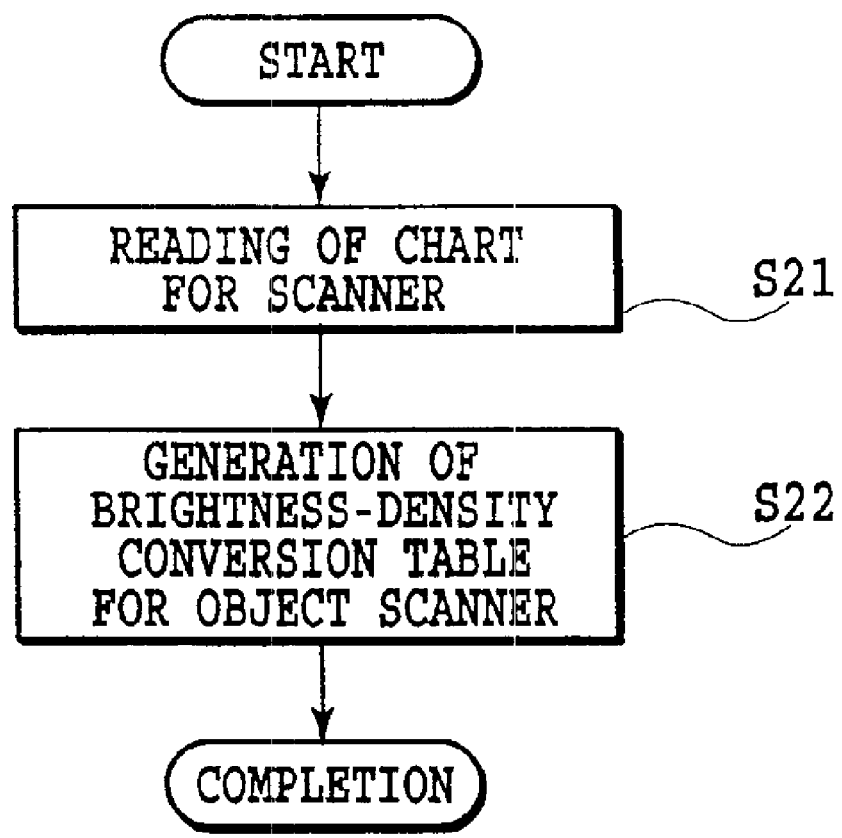
FIG. 2 is a flow chart showing a process of generating a brightness-density conversion table for a scanner in the first embodiment.

FIG. 2 is a flow chart showing an outline process of generating the brightness-density conversion table, that is, an outline process of the scanner calibration. In FIG. 2, at step S20, the scanner 3 reads a scanner chart. The scanner chart is reference paper, on which predetermined patches are printed in advance by means of offset printing and others. The scanner chart is different from a printer chart output by the printer in a calibration process for the printer 2 described later referring to FIG. 7.

Figures 4, 4A:
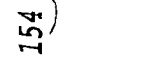
Figure 4B:
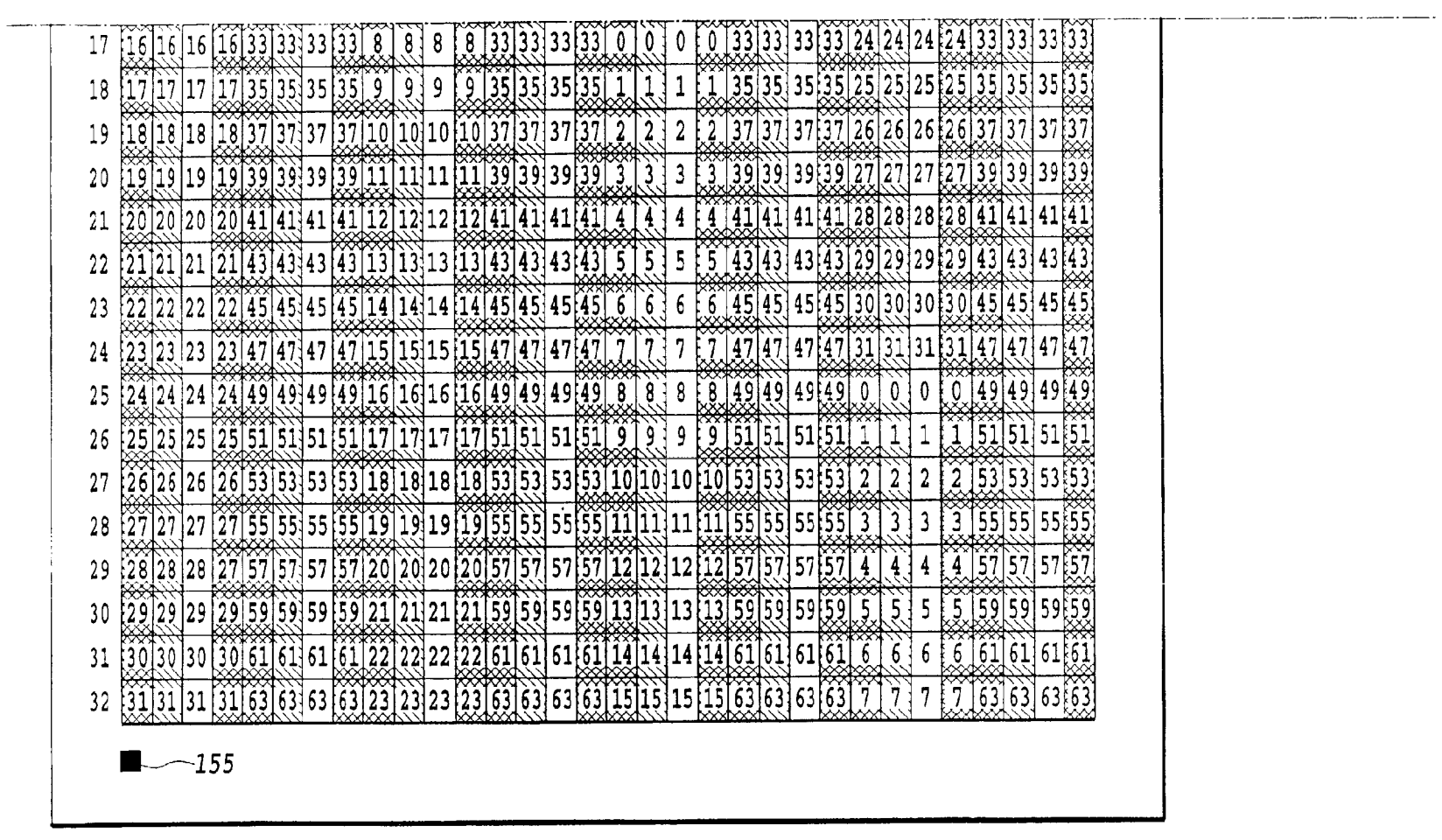

FIGS. 4A and 4B are diagrams showing an example of the scanner chart. In FIGS. 4A and 4B, the numeral 151 represents the entire scanner chart, the size of which is A4. The numeral 152 represents a data section, shown as a total of 1024 blocks obtained by the data section being divided into 32 parts throughout both a longitudinal and a lateral directions in a page. Concretely, each block forms the patch and the scanner 3 measures the density of each patch. Numbers in the blocks correspond to the density of the patches as in FIGS. 8A and 8B described later, and are not printed in reality.

Figures 8, 8A, 8B:
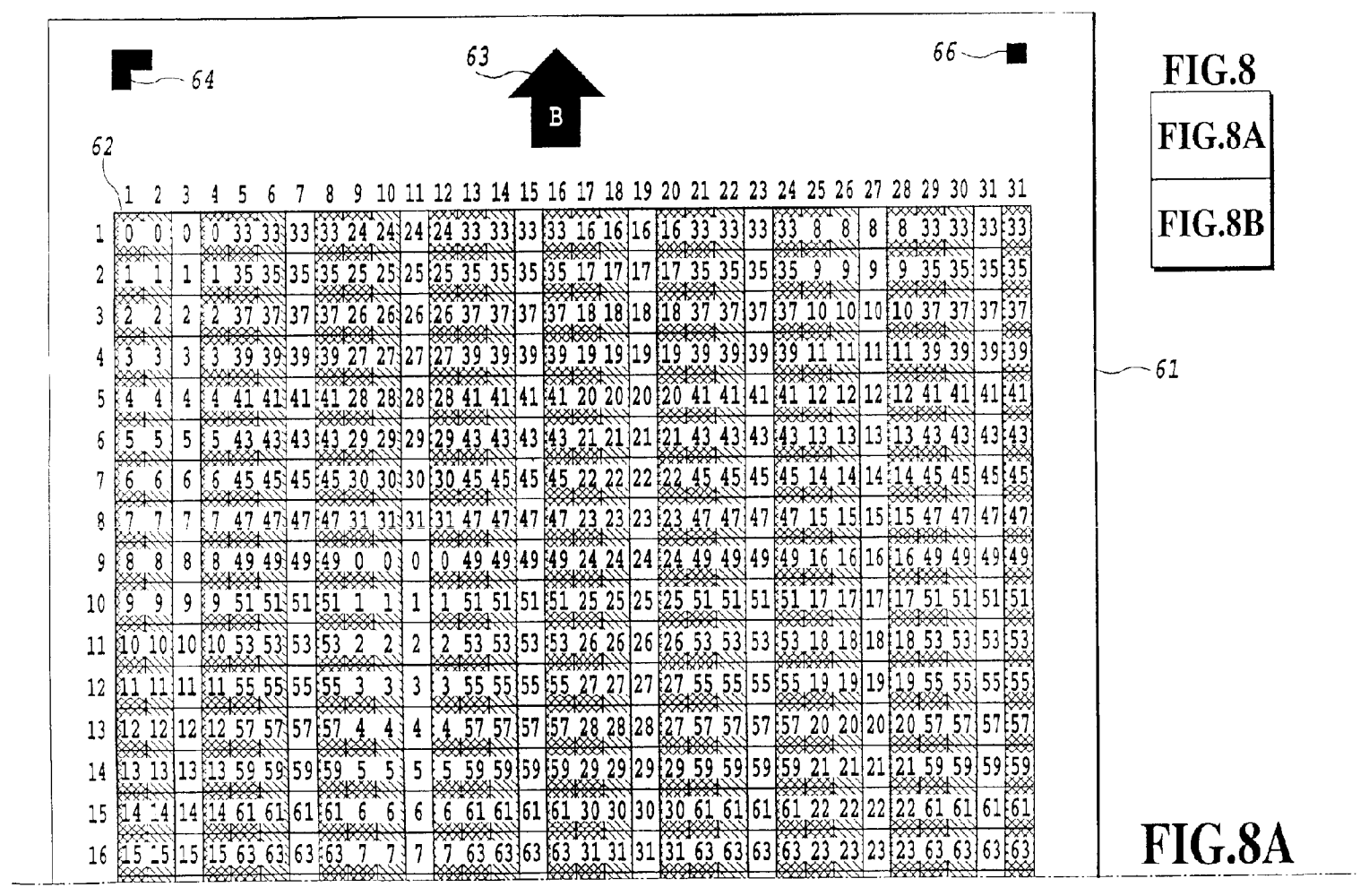
Figure 8B:
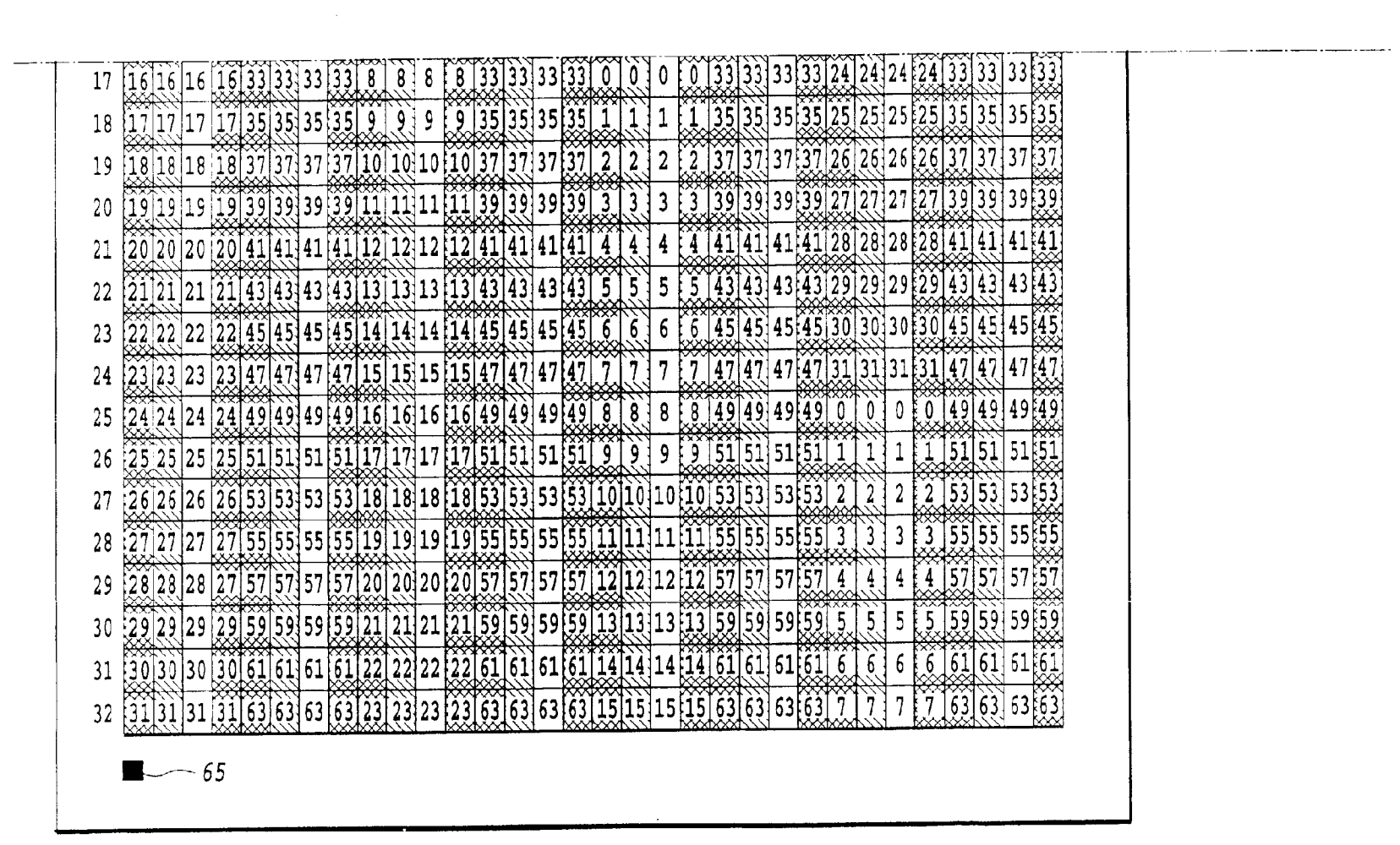

The numeral 153 represents discrimination information for discriminating the chart, and the like. More specifically, the discrimination information being in a form of an arrow enables the user to know a direction in which the chart is placed on a manuscript table of the scanner, and a letter "A" being printed inside the arrow allows the user to discriminate that the chart is the scanner chart. In FIGS. 8A and 8B described later, an arrow which is discrimination information of a printer chart is daubed with a certain color (cyan, for example), while in FIGS. 4A and 4B the arrow of the scanner chart is daubed with another color (magenta, for instance), which facilitates the user's discrimination. The numerals 154, 155 in FIGS. 4A and 4B represent registration marks respectively indicating reading position information.

Figure 5A:
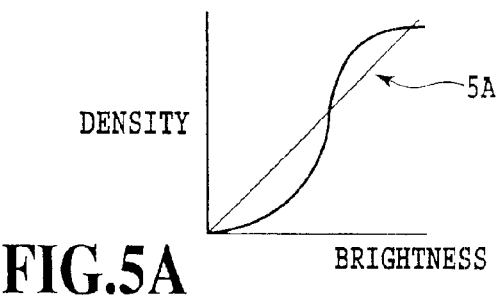
FIGS. 5A–5F are diagrams for explaining the detail of the generation of the brightness-density conversion table.
Figure 5B:
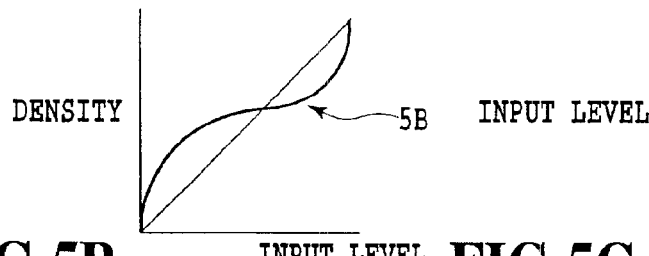

FIG. 5B is a diagram showing an example of property data obtained when the scanner chart is read by the scanner 3 at step S20 shown in FIG. 2. In FIG. 5B, a horizontal axis represents an input level determined for each patch, while a vertical axis represents the brightness output by the scanner 3. Although an actual number of input levels is 48 for each color, the scanner characteristic 5B is obtained as a relation of 256 levels by means of an approximation formula and others. It should be noted that, in FIGS. 5A–5F, only one kind of data is described for the sake of the simplification of description, but needless to say, there are four kinds of data of C, M, Y, K.

The property data obtained as described above of the scanner 3, which is the object scanner, is stored in a memory not shown of the server PC.

When reading of the scanner chart described above is completed, then at step S21 the object scanner brightness-density conversion table is generated and thereby the scanner calibration process is completed.

Figure 3:
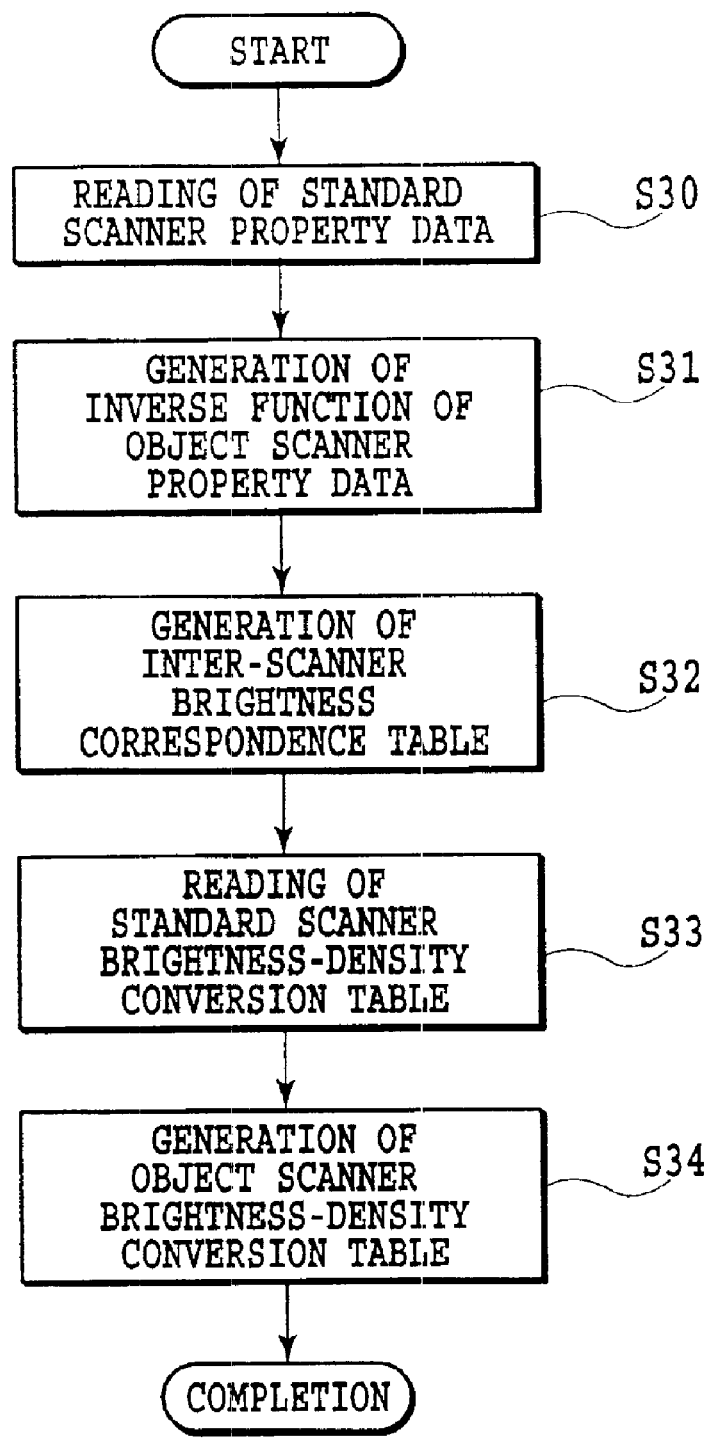
FIG. 3 is a flow chart showing a detailed process of generating the table shown in FIG. 2.
Figure 5C:
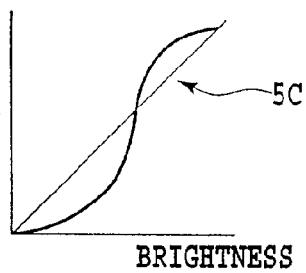
Figure 5D:
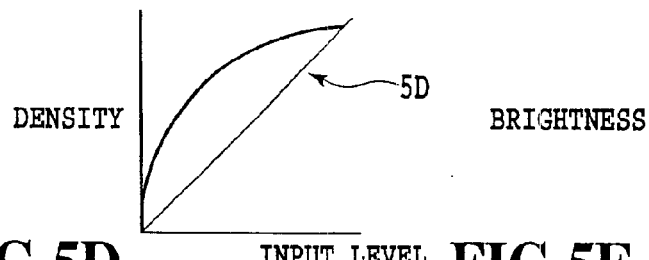

FIG. 3 is a flow chart showing a detail of the process of generating the table at step S21. In FIG. 3, first at step S30 the standard scanner property data is read in from the calibration data storing section 11 of the server PC 1. The data, as described above, is previously stored in the standard scanner property data storing section 113. FIG. 5D shows an example of the data, and the data 5D can be obtained by that the scanner chart shown in FIGS. 4A and 4B is read in advance by means of the standard scanner.

Next at step S31 an inverse function of the object scanner property data is generated. FIG. 5C is a diagram showing the inverse function. More specifically, a process of Step S31 generates a symmetrical function of the reading property data 5B (FIG. 5B) obtained at step S20 as described above of the scanner 3, which is the object scanner and is, with respect to a line y (brightness)=x (input level). That is, the step S31 generates the inverse function where a relation based on the vertical axis and the horizontal axis shown FIG. 5B is turned over, so that the inverse function data 5C shown in FIG. 5C can be generated.

Figure 5E:
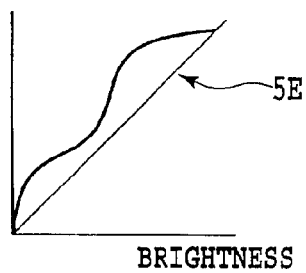
Figure 6:
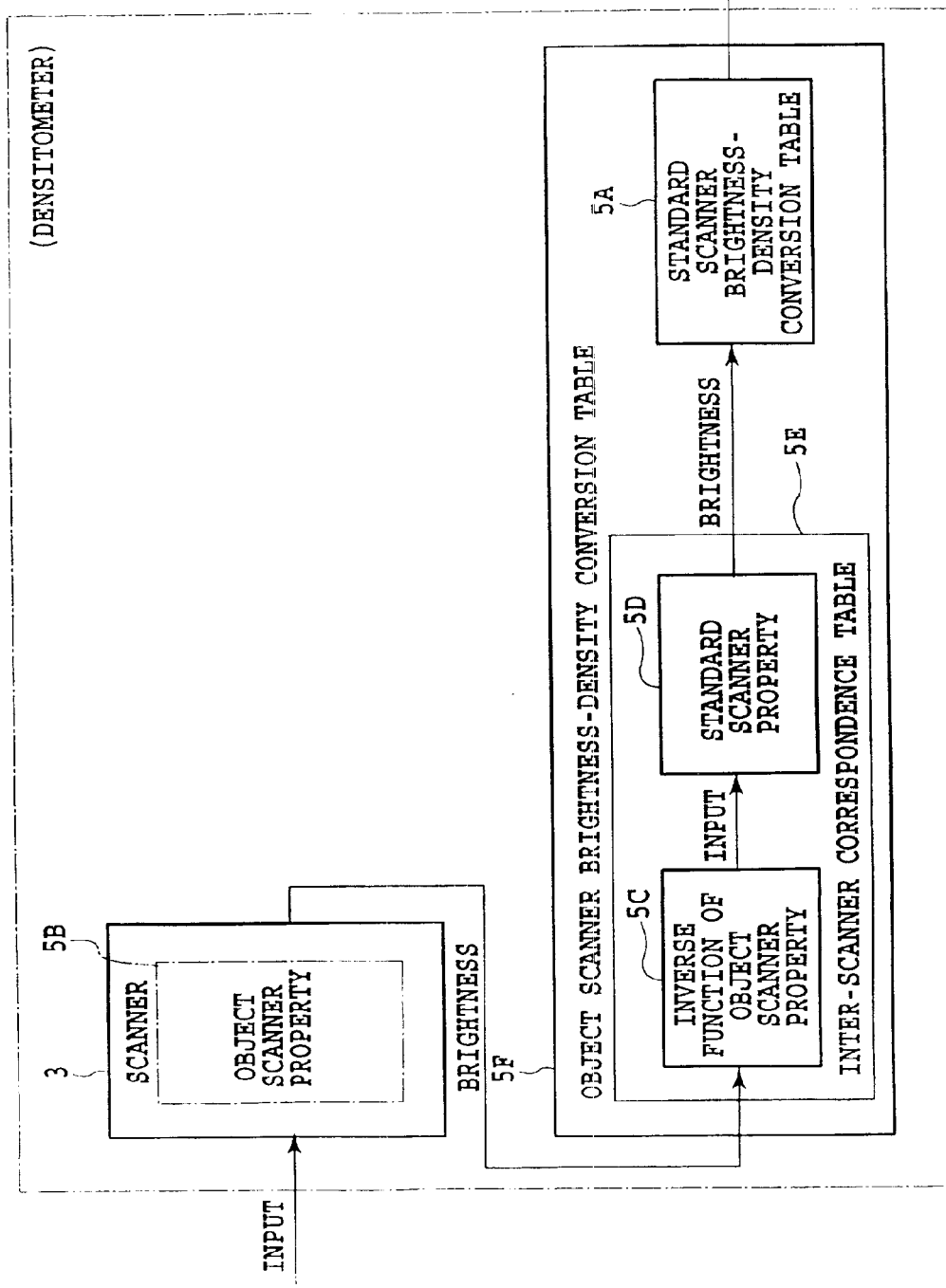
FIG. 6 is a block diagram for explaining the detail of the brightness-density conversion table.

At step S32 an inter-scanner brightness correspondence table is generated. The inter-scanner brightness correspondence table 5E shown in FIG. 5E is obtained by combining the inverse function 5C (FIG. 5C) of the object scanner property obtained and the standard scanner property 5D (FIG. 5D), which are obtained at the previous steps S31, S30, respectively. The table 5E, as also shown in FIG. 6, is a table which makes an input brightness for the inverse function of the object scanner property correspond to an input brightness for the standard scanner property. This table can be also obtained by an approximation formula and others.

Next, at step S33 the standard scanner brightness-density conversion table is read from the calibration data storing section 11 of the server PC 1. The table is stored in advance in the standard scanner brightness-density conversion table storing section 111 of the storing section 11. An example of the table data is shown in FIG. 5A. The data can be obtained in the following way: the scanner chart described above in FIGS. 4A and 4B is read in advance by the standard scanner and the densitometer, and the brightness detected by the standard scanner and the density read by the densitometer, which are normalized in a range of 0 to 255, are made to correspond to each other. In other words, the density obtained by the conversion using the brightness-density conversion table 5A, which is made correspond to the standard scanner, becomes a device-independent value like the density detected by the densitometer.

It is needless to say that the chart for the scanner calibration is not limited to that shown in FIGS. 4A and 4B and that the range of normalization for the detected brightness and the read density value is not to the range of 0–255.

Figure 5F:
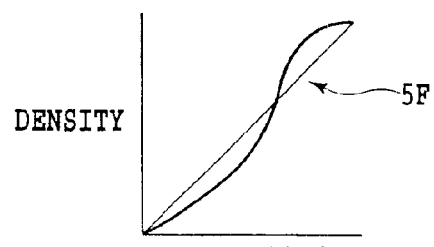

Then at step S34 the object scanner brightness-density conversion table is generated. As shown in FIG. 6, this table can be obtained by combining the standard scanner brightness-density conversion table 5A obtained in the previous step S33 and the inter-scanner brightness correspondence table 5E obtained in step S32. FIG. 5F is a diagram showing an example of the table 5F.

The above-mentioned processes of steps S30–S34 finally generate the brightness-density conversion table 5F for the scanner 3, which is the object scanner, dynamically, and then stores the generated table in the object scanner brightness-density conversion table storing section 111 in the server PC 1. As a result, the scanner 3, which is the object scanner, is used for reading the chart printed out by the printer 2 and the brightness data obtained by reading is converted by using the brightness-density conversion table, when executing the calibration for the printer described below, so that it becomes possible to use the scanner 3 as an apparent densitometer, as shown in FIG. 6.

When the input property of the scanner changes, or when different types of scanners are employed for the system, it becomes possible to obtain a universal brightness-density conversion relation by conducting the scanner calibration again. The scan of the scanner is carried out through a scanner driver usually formed on the PC 1, though the detail thereof will not be mentioned here. Through scanner driver, a scanning resolution, designation of an input area and so on are set.

The calibration for the printer in this embodiment using the scanner 3 calibrated as described above will be described with reference to a flow chart shown in FIG. 7.

First at step S41 the server PC 1 gives an instruction to output a chart of patches to the printer 2 through the network, and then the printer 2 outputs the chart. Supposing that a plurality of printers is connected through the network, the server PC 1 specifies the printer which is subject to the calibration and outputs the chart. These processes are executed in accordance with network management rules, but they will not be mentioned here.

An example of the chart is shown in FIGS. 8A and 8B. In FIGS. 8A and 8B, the numeral 61 represents the entire printer chart, the size of which is A4. The numeral 62 represents a data section for detecting the density property of the printer, consisting of the total of 1024 blocks obtained by that the data section is divided into 32 parts throughout both a longitudinal and a lateral directions in a page. Concretely, each block forms a patch, and numbers in the blocks are not printed in reality as in FIGS. 4A and 4B. In the lateral direction, blocks are arranged separately for each of base colors of a print toner, that is, Cyan, Magenta, Yellow, Black. The numerical value in each block represents an attached number for an array, and a relation between the attached numbers and the actual numerical values is as shown in a list in FIG. 9. For example, the actual output data of the array 0 is 0, the actual output data of the array 32 is 128, and the actual output data of the array 63 is 255. In a system of 8 bits for each color of C, M, Y, K, the numerical values ranging from 0 to 255 are used, while in a system the bit number of which is otherwise, the numerical numbers of the correspondence list shown in FIG. 9 are altered.

In FIGS. 8A and 8B, on the highlight side of the arrays 0–31, four blocks of 32 gradations are arranged, while on the shadow side of the arrays 33–63, eight blocks of 16 gradations are arranged. There is a difference in the number of gradations between the highlight and the shadow because the highlight side requires detail gradation information than the shadow side in this system. Further, there is a difference in the number of the arranged highlight blocks and the arranged shadow blocks because there tends to be a wider variety in the input value of the scanner on the shadow side than on the highlight side.

The numeral 63 in FIGS. 8A and 8B represents discrimination information. The discrimination information, which is in a form of an arrow, enables the user to know the direction in which the chart is placed on the manuscript table of the scanner 3, and a letter "B" inside the arrow allows the user to discriminate that the chart is a printer chart.

The numerals 64, 65, 66 in FIGS. 8A and 8B represent registration marks for detecting whether the chart is placed correctly on the manuscript table of the scanner.

The printer chart is output from the printer 2 based on the instruction through the network from the server PC 1 as described above, however it may be possible to have the printer 2 possess the information of constituting the patch data of the format and to generate the patch data based on the information according to the instruction from the PC 1, or to generate the patch data by sending the patch data constitution information to the printer 2 from the PC 1. The patch data constitution information is dependent on a command system possessed by the printer 2, but will not be mentioned here.

After the patches are printed as described above, at step S42 the density of the output patches is measured by means of the scanner 3. More specifically, the scanner 3 generates a brightness signal value of R, G, B concerning each patch and gives the value to the PC 1. On receiving input values, the PC 1 calculates the average of input values of four points for the highlight side and the average of input values of eight points for the shadow side, based on the arrangement of the blocks of the patch, and thereby obtains 48 gradations of R, G, B signal values for each color of C, M, Y, K. These R, G, B brightness signals are converted by means of the above described brightness-density conversion table 5F into density signals to obtain 48-gradations brightness signals. Each patch shown in FIGS. 8A and 8B is read by the scanner 3 used as the densitometer, and thereby it becomes possible to obtain the density value correctly reflecting an output characteristic of the printer 2.

Figure 10A:
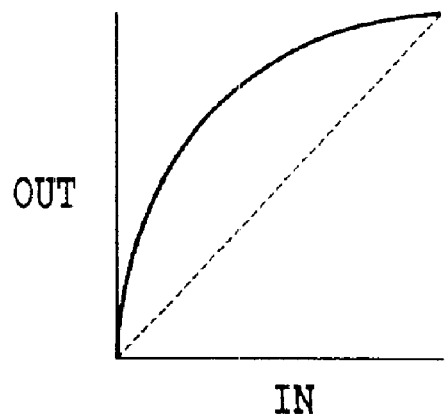
FIGS. 10A, 10B and 10C are diagrams for explaining generation of a calibration table according to an embodiment of the present invention.
Figure 10B:
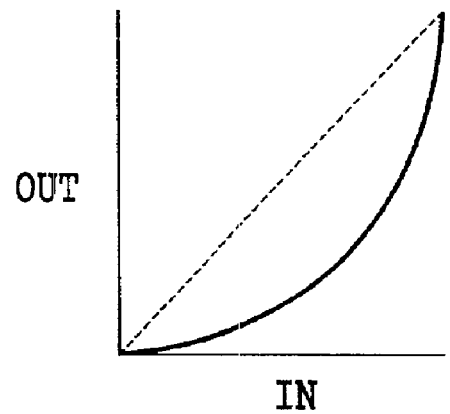
Figure 10C:
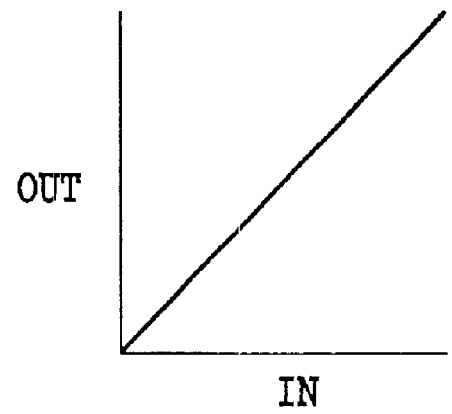

Then at step S43 the server PC 1 generates the calibration table. The process will be described with reference to FIGS. 10A–10C. FIG. 10A shows a property obtained from the 48-gradations density value for each color obtained at step S42. For the sake of simplicity, the process for only one color is illustrated here, but the same process is carried out for four colors of C, M, Y, K in reality. FIG. 10A illustrates a curve showing a relation between input and output, which is obtained by an interpolation calculation for the 48 gradation density values. Although the property is as shown in FIG. 10A, an ideal density property is what is represented by a linear curve as shown in FIG. 10C. In order to approximate the present density property (FIG. 10A) to the ideal density property (FIG. 10C), the inverse function shown in FIG. 10B is set as contents of the calibration table. In other words, by applying the function shown in FIG. 10B to the property shown in FIG. 10A, the input and output relation shown in FIG. 10C is obtained as a result. The calibration table thus obtained is used for a density correction in an image processing in the printer 2 as described later referring to FIG. 12.

At step S44 the server PC 1 downloads the calibration table data obtained as described above to the printer 2 through the network, and then completes the process. In the downloading, the sever PC specifies the object printer supposing the case in which a plurality of printers are connected through the network as in the case in which the patch data is output. The downloaded calibration data is stored in the calibration data storing section 21. A downloading command and others in this process are dependent on the command system of the printer 2, but will not be mentioned here.

Figure 11:
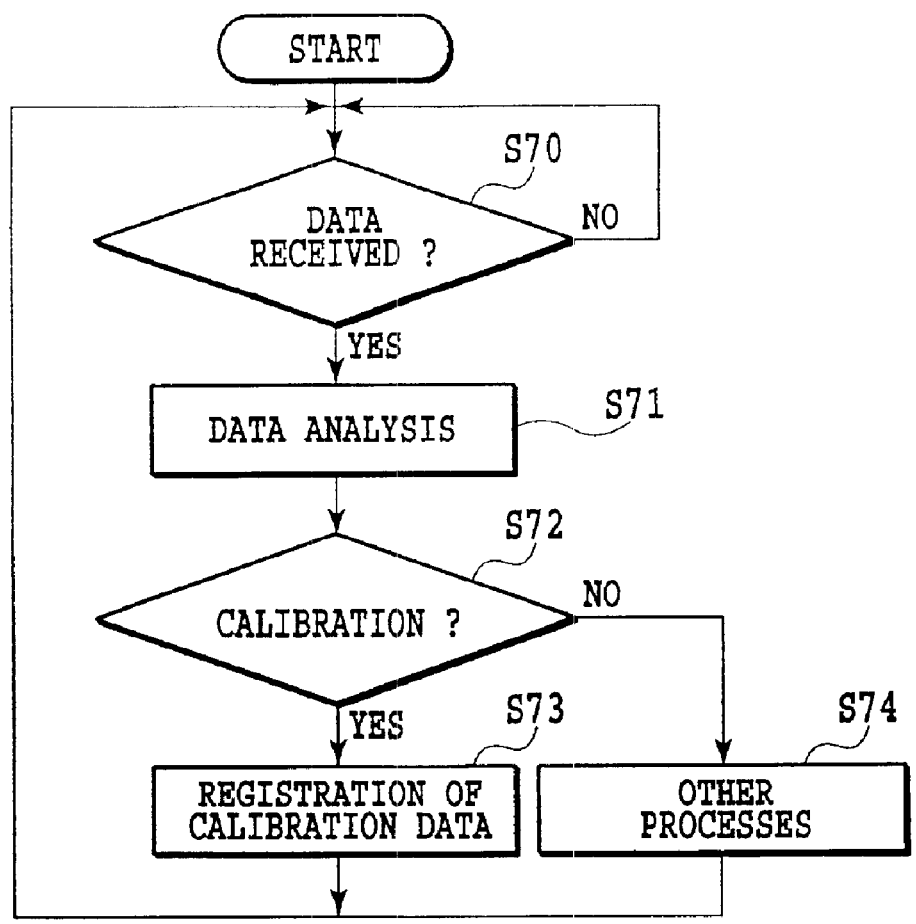
FIG. 11 is a flow chart showing a process of the printer including a process of the printer calibration according to an embodiment of the present invention.

FIG. 11 is a flow chart showing a process executed by the printer 2 and a process on receiving download data from the server PC 1. At step S70 of FIG. 11, a judgment is made whether the data is received or not. When the data is not received, step S70 is repeated. When the data is received, the data is analyzed at step S71. The analysis result is judged at step S72; when the data is judged to be a calibration download command, the calibration data is stored in the calibration data storing section 21 at step S73 as described above. When the data is judged not to be the calibration download command at step S72, corresponding processes to the judges are carried out at step S74.

Usual print data is sent to the printer 2 from an application on the PC 1 through a printer driver also on the PC 1. The printer 2 analyzes the print data, composes a page layout, executes an image processing, prints an image and so on at step 74 and others.

Figure 12:
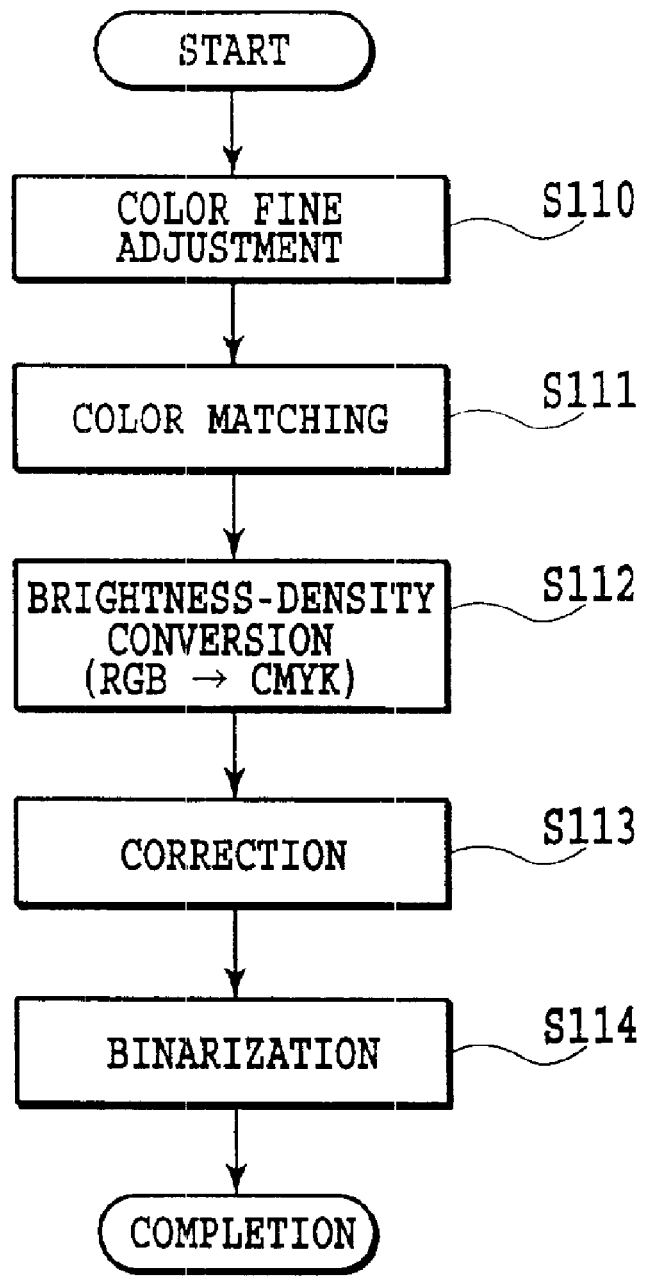
FIG. 12 is a flow chart illustrating a process concerning usual printing among the process of the printer.

FIG. 12 is a flow chart showing, among the above-mentioned processes, the image processing using the downloaded calibration data. First step S110 color fine adjustment is carried out with respect to input signals RGB. The color fine adjustment refers to a brightness correction and a contrast correction. Then at step S111 a color matching processing is executed. The color matching processing is a process carried out to match a color shown by a monitor and a color shown in printing by a printer. Next at step S112 a brightness-density conversion processing is executed. This is a process of converting brightness RGB, which are input signals, to density CMYK, which are print signals for the printer. At step S113 a correction processing is carried out. More specifically, the correction processing has input signals of 8-bit multi-valued signals for respective C, M, Y, K and makes print output characteristics of the printer relative to the input signals linear by using the calibration table data described above. Next at step S114 the 8-bit multi-valued signals for respective C, M, Y, K are converted into signals adapted to an output system. Generally, the 8-bit signals are binarized to be converted to 1-bit signals for respective C, M, Y, K.

Figure 13:
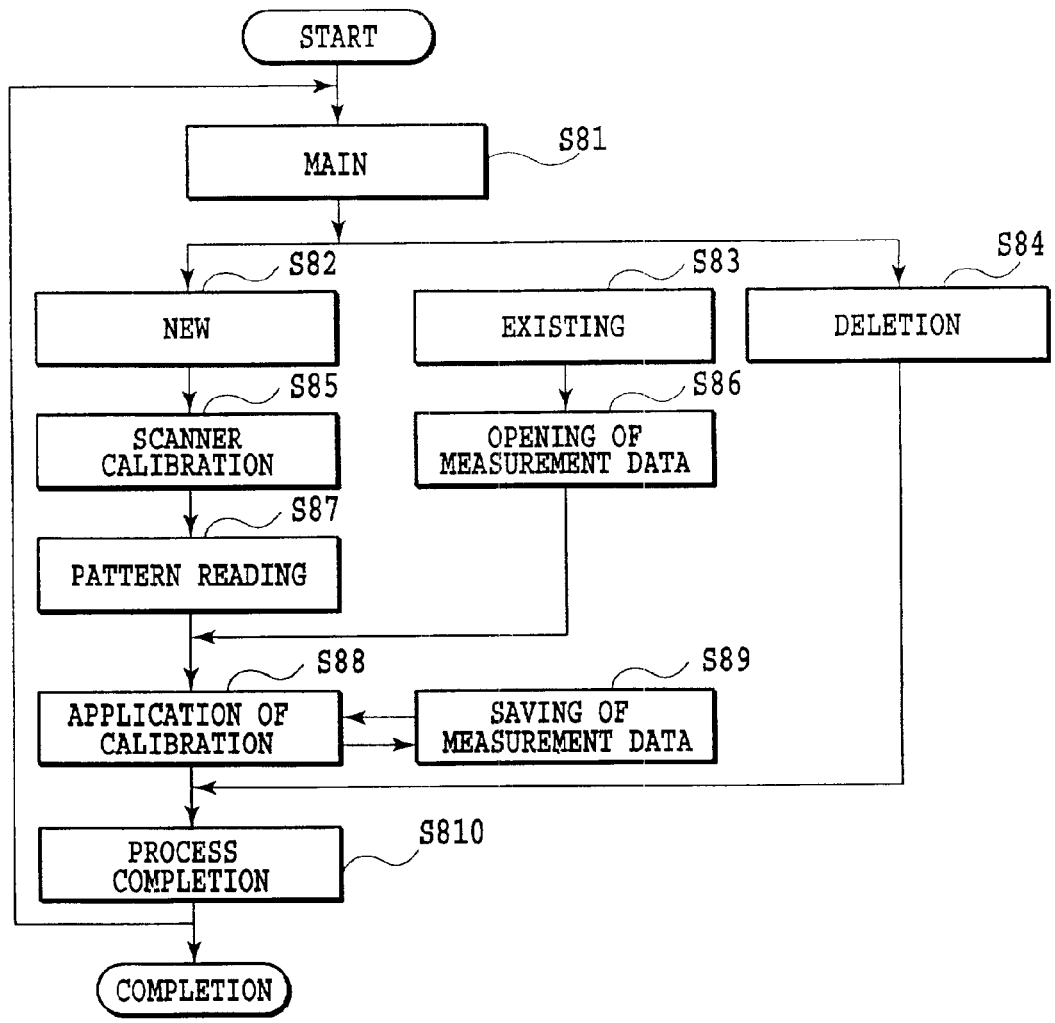
FIG. 13 is a flow chart showing an application process concerning the respective calibrations for the scanner and the printer according to the first embodiment.
Figure 14:
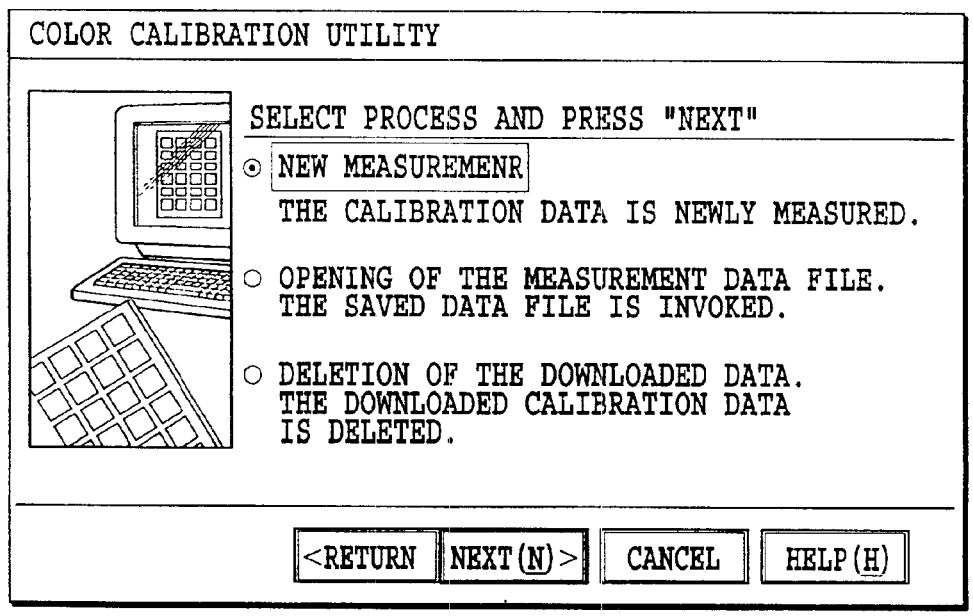
FIG. 14 is a view illustrating an example of a picture displayed in the application.

FIGS. 13 and 14 are respectively a flow chart and a view for showing a process of the above described scanner calibration and the printer calibration using a result of the scanner calibration, which is executed by the PC 1 in the print system of this embodiment, from a viewpoint of a user interface (UI). The process is arranged in the server PC 1 as a sort of application.

At step S81 a main picture is displayed. FIG. 14 shows an example of the main picture. The processing is basically structured to cause other pictures to appear when buttons "Next," "Return," "Cancel," "Help" shown in FIG. 14 are pressed. The main picture shown in FIG. 14 provides three selection menus of "New," "Open the existing measurement data," "Delete the download data." If "New" is chosen and "Next" is pressed, the process moves to step S82. At step S82 the patch data is output to the printer 2. Then at step S85, as described above, the PC 1 performs the processing for calibrating the scanner 3 and thereby generates the brightness-density conversion table 5F (FIGS. 5F and 6) peculiar to the scanner 3.

At step S87, as described above at steps S41, S42 of FIG. 7, the patch data is measured by means of the scanner 3 and the brightness-density conversion table 5F. At step S88 the calibration is applied to the printer. In this step the above-described processes at steps S43, S44 of FIG. 7, that is, the generation of the calibration data, the download of the data to the printer 2 are carried out. Step S88 provides a button for moving to step S89, and if the user presses the button, the processing moves to step S89. Step S89 displays a picture for enabling the measurement data to be saved, and for saving the scan data measured at step S87. The saved file can be used in a process using the existing measurement data described below. When the process of Step S89 is completed, the process returns to step S88. Then at step S810 the process completion picture is displayed. If the user designates the completion of the application on the picture, the process is completed, while if the user designates the return to the main picture, the process returns to step S81.

When the user chooses "Open the measurement data" and presses "Next" on the main picture in step S81, the process proceeds to step S83 and there appears a picture for indicating the measurement data. Here, when the user presses a "reference" button, a picture for reading the measurement data appears at step S86. This picture enables the user to search the measurement data in detail. The measurement data is the data file saved at step S89. Then at step S88 the calibration is applied. The subsequent processes are the same as described above.

When the user selects "Delete the download data" and presses "Next" on the main picture in step S81, at step S84 the calibration data stored in the calibration data storing section 21 of the printer 2 is deleted. This process is carried out in accordance with an instruction by a command from the PC 1 to the printer 2, but the command is not mentioned here.

Then the picture changes to the completion picture display process step S810. The subsequent processes are as described above.

As described above, in this embodiment, supposing that there are a plurality of printers connected through the network, it becomes necessary to designate an object printer; concretely, the designation is done on the UI when the patch data is printed at step S82 in FIG. 13. The application is capable of giving an instruction to output the patch and downloading the calibration data to the designated printer.

As can be seen from the above description, according to the embodiment, by calibrating a printer by means of a scanner capable of reading with as high accuracy same as a densitometer, it becomes possible to perform color printing always stably.

It also becomes possible to use any type of scanner as an object scanner. Accordingly it becomes possible to provide calibration conditions with high accuracy using existing devices without particularly purchasing an expensive densitometer and others. And it also becomes possible to use more than one type of scanners.

<Second Embodiment>

A second embodiment of the present invention will be described in detail below.

In the above-described first embodiment, even if the standard scanner is used as the object scanner for the scanner calibration, the print system is adapted to execute a process of the scanner calibration. In contrast in this embodiment, if the standard scanner is used as the object scanner, the scanner calibration is skipped and the subsequent steps are executed using a standard scanner brightness-density conversion table generated in advance.

Accordingly, a configuration of the printer calibration in this embodiment is basically the same as in the first embodiment, but differs from the first embodiment in following points. In the embodiment a judgment is made as to whether the scanner for use is a standard scanner or not. When the scanner is judged to be the standard scanner, the step of the scanner calibration is skipped, and then the subsequent steps are executed using the standard scanner brightness-density conversion table generated in advance. Also a control method for the above configuration different from that of the first embodiment.

The different points from the first embodiment will be described below.

Figure 15:
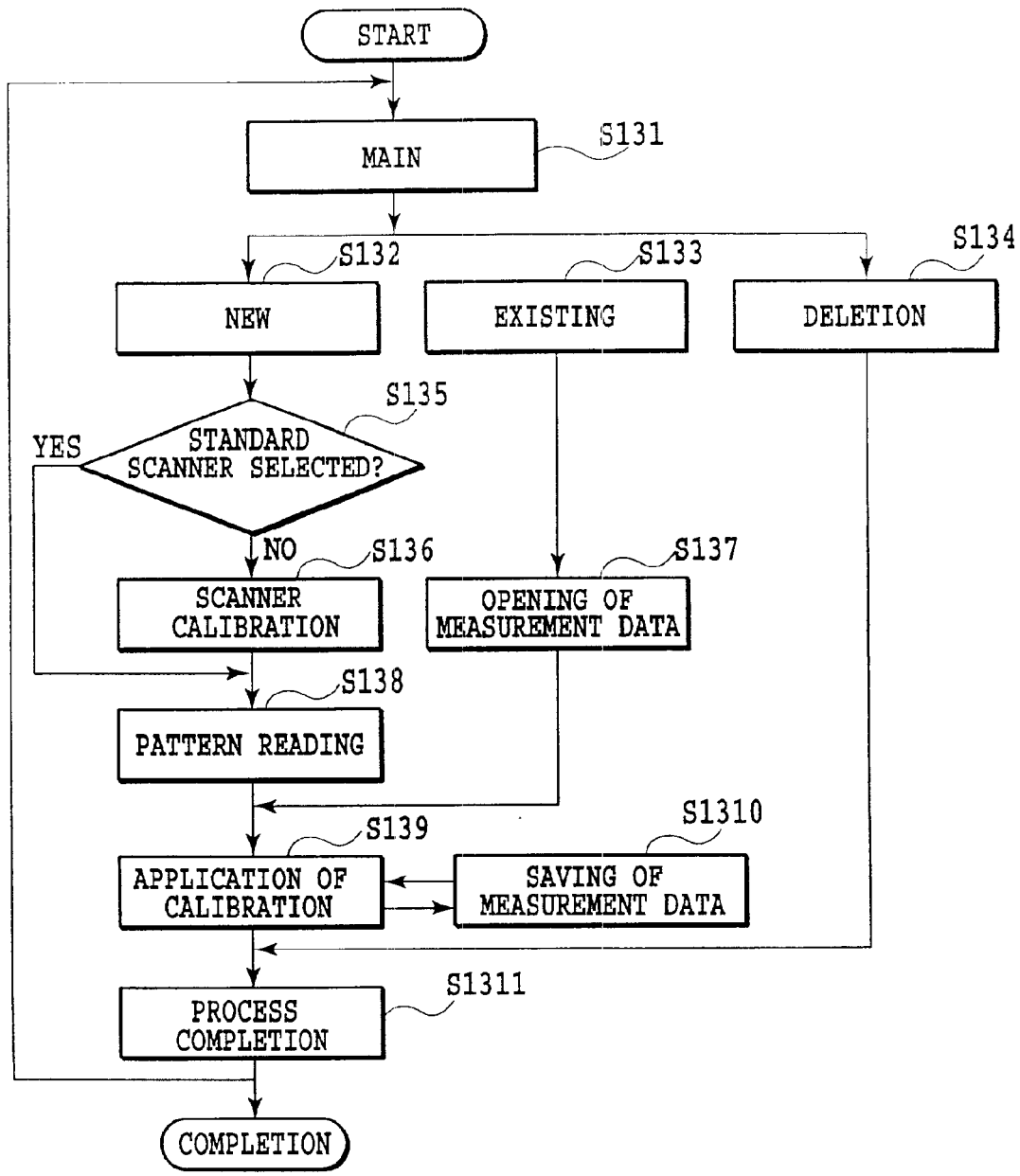
FIG. 15 is a flow chart showing an application process concerning respective calibrations for a scanner and a printer according to a second embodiment of the present invention.

FIG. 15 is a flow chart showing a process of a user interface (UI) in a PC 1 of a print system according to the second embodiment of the present invention, and shows similar process to FIG. 13.

Figure 16:
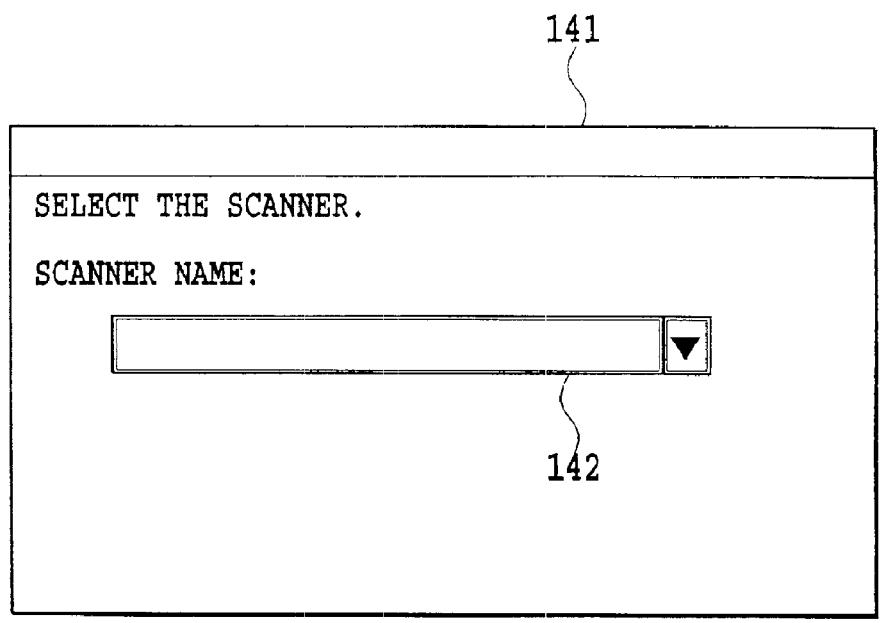
FIG. 16 is a view illustrating a display picture for selecting the scanner in the above-mentioned process.

At step S131 a main picture is displayed. FIG. 14 shows an example of the main picture as described above. The processing is basically structured to cause other pictures to appear when buttons "Next," "Return," "Cancel," "Help" shown in FIG. 14 are pressed. The main picture shown in FIG. 14 provides three selection menus of "New," "Open the existing measurement data," "Delete the download data." If "New" is chosen and "Next" is pressed, the process moves to step S132. At step S132 the patch data is output to the printer 2. Then at step S135 a judgment is made as to whether the standard scanner is selected as an object scanner or not at that point. FIG. 16 shows an example of a scanner selection picture. The picture is displayed after the main menu (picture). In FIG. 16 the numeral 141 represents a scanner selection dialogue, and the user can select an arbitrary scanner by means of a pull-down menu 142. In the process of step S135 a judgment is made as to whether the selected scanner is the standard scanner or not based on a name of the selected scanner.

When it is judged that the selected scanner is not the standard scanner, at step S136 the scanner 3 is calibrated by the PC 1 as described above, and the brightness-density conversion table 5F peculiar to the scanner 3 is generated.

On the other hand, when the selected scanner is judged to be the standard scanner at step S135, the process of step S136 is skipped, and the brightness-density conversion table 5F is loaded from the standard scanner brightness-density conversion table storing section 112 shown in FIG. 1 and is used in the subsequent steps. Then at step S138, as described above, the patch is measured by means of the scanner 3 and the brightness-density conversion table 5F, and at step S139 the calibration is applied.

In the second embodiment, the same processes as in the first embodiment are executed except the processes in which a judgment is made as to whether the used scanner is the standard scanner or not, and when the used scanner is judged to be the standard scanner, the step of the scanner calibration is skipped, and then the subsequent steps are executed using the standard scanner brightness-density conversion table generated in advance; thus the description will be omitted.

As can be seen from the above description, according to the second embodiment, the scanner calibration step can be skipped when the standard scanner is used as the object scanner, and thereby the efficiency of the processes can be improved.

According to the first and second embodiments, it is possible to calibrate a reading means such as a scanner with high accuracy, and to use the reading means as a reading means such as a densitometer, which can detect density with high accuracy.

It is also possible to generate dynamically a brightness-density conversion table for a reading means in the calibration of the reading means so that not only a fixed type of device but all purpose types of apparatus may be employed as the reading means.

In addition, it is possible to reduce burden of the user required for the calibration of a reading means as much as possible.

<Third Embodiment>

A third embodiment of the present invention is directed to a configuration that, in the scanner calibration similar to that in the first and second embodiments, if the measurement result, which is obtained by reading the chart shown in FIGS. 4A and 4B, is inappropriate for the subsequent generation of the brightness-density conversion table, processes such as doing again of reading are executed.

Figure 17:
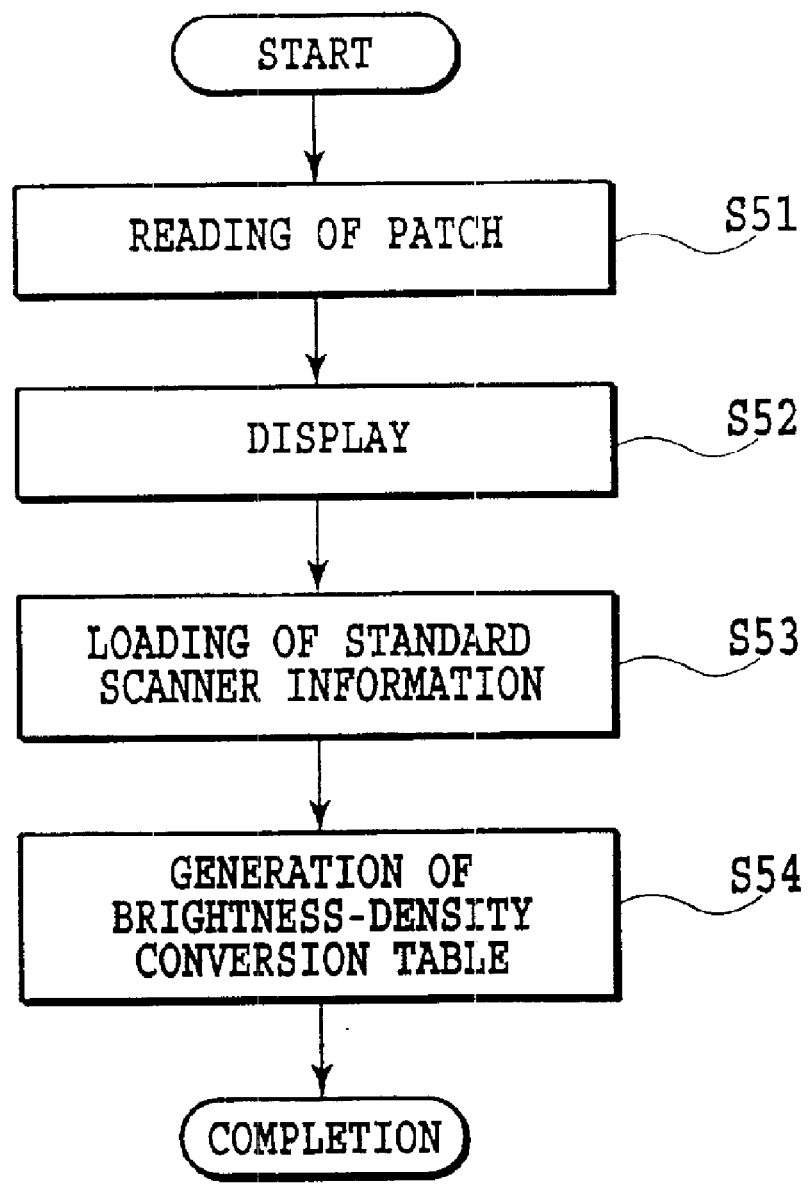
FIG. 17 is a flow chart showing a process of generating a brightness-density conversion table for a scanner in a third embodiment of the present invention.

FIG. 17 is a flow chart showing a sequence of processes of generating the brightness-density conversion table in this embodiment. At step S51 the predetermined patches shown in FIGS. 4A and 4B is read by means of the scanner 3 which is an object of the scanner calibration, and thereby brightness signal values are obtained.

Figure 18:
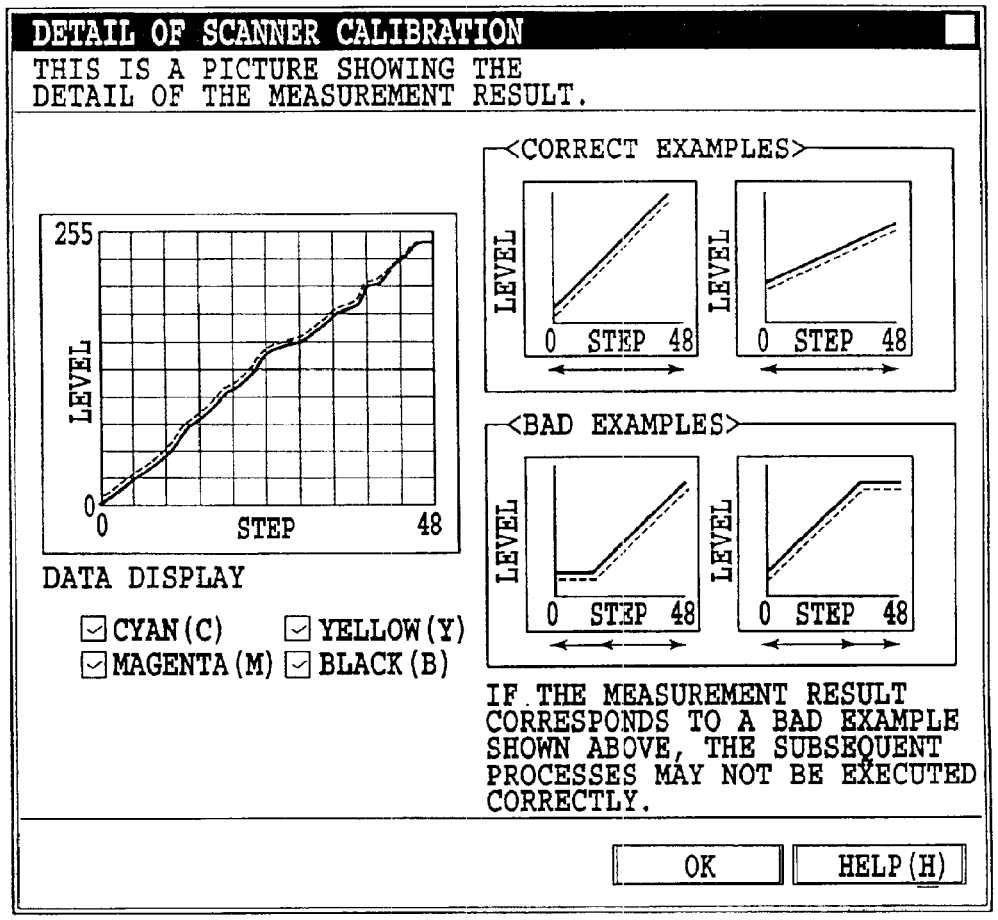
FIG. 18 is a view illustrating an example of a display picture of the process shown in FIG. 17.

At step S52 a measurement result obtained in step S51 is displayed as shown in FIG. 18. In order to measure the density with high accuracy by using a scanner as similarly to a case of using a densitometer, it is necessary to use the input range of the scanner efficiently. If the measurement result is like bad examples shown in FIG. 18, in which output values in a certain range are the same, an effective correction process cannot be carried out for this range. That is, an effective brightness-density conversion table cannot be generated. Thus in order to measure the density with high accuracy by using the scanner as similarly to the case of using the densitometer, it is necessary that the measurement result in step S51 should be like correct examples shown in FIG. 18.

If the color measuring result for each color of C, M, Y, K shown on the left side of FIG. 18 is like bad examples shown on the right side of FIG. 18, in which the output level is the same in a certain input range, the user is advised to redo the process at step S51 in this embodiment.

In the case that the reading result is like bad examples in FIG. 18, it may be possible to improve the reading result by altering the scanner reading conditions such as resolution, color processing conditions, color matching conditions.

Next, at step S53, the standard scanner property obtained by that the scanner calibration patch used at step S51 is measured in advance by means of the standard scanner separately, and the data of the standard scanner brightness-density conversion table are loaded. The data is, as described in the first embodiment, stored in advance in predetermined memories.

At step S54 based on the brightness signals R, G, B read at step S51 and the standard scanner information loaded at step S53, as described above, a brightness-density conversion table, which is used for reading with use of the scanner on the printer calibration, is generated. This process completes the calibration of the scanner 3.

<Fourth Embodiment>

In the first to third embodiments, as described as to FIG. 13, for example, each time calibration for the printer is performed, generation of the brightness-density conversion table by using the scanner calibration patch and the corresponding density data is executed. In contrast in this embodiment, the brightness-density conversion table is prepared in advance for each type of scanner, which may be employed, and the brightness-density conversion table appropriate for the type of scanner used in the system is downloaded and used.

Figure 19:
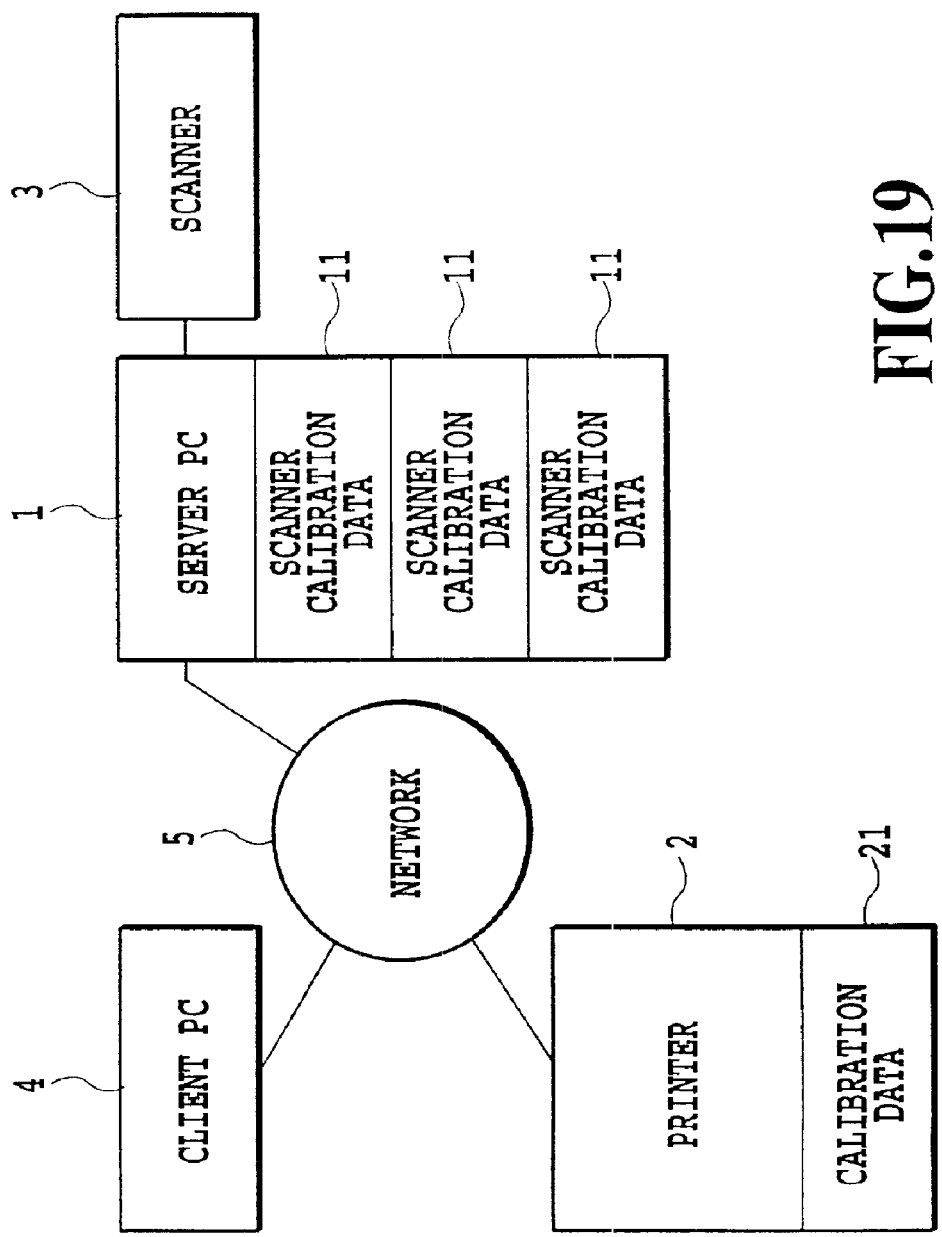
FIG. 19 is a block diagram showing a configuration of a print system according to a fourth embodiment of the present invention.

FIG. 19 is a block diagram showing a configuration of a print system according to this embodiment.

The configuration of this embodiment is basically the same as the configuration shown in FIG. 1 according to the first to third embodiments. The difference is that in this embodiment there are a plurality of scanner calibration data storing sections in accordance with the type of scanners which the server PC 1 may employ. In the example shown in FIG. 19, there are the storing sections 1911, 1912, 1913 for different types of scanners of a scanner A, a scanner B, a scanner C, respectively. In the example shown in FIG. 19, since the scanner A is connected to the server PC 1 to be used, when the printer 2 is calibrated or when the normal printing is carried out, the calibration data of the scanner A in the storing section 1911, that is, the brightness-density conversion table for the scanner A is used. The brightness-density conversion tables corresponding to the type of the scanners are, as described as to FIG. 17, prepared in advance and are stored in the corresponding storing sections.

Figure 7:
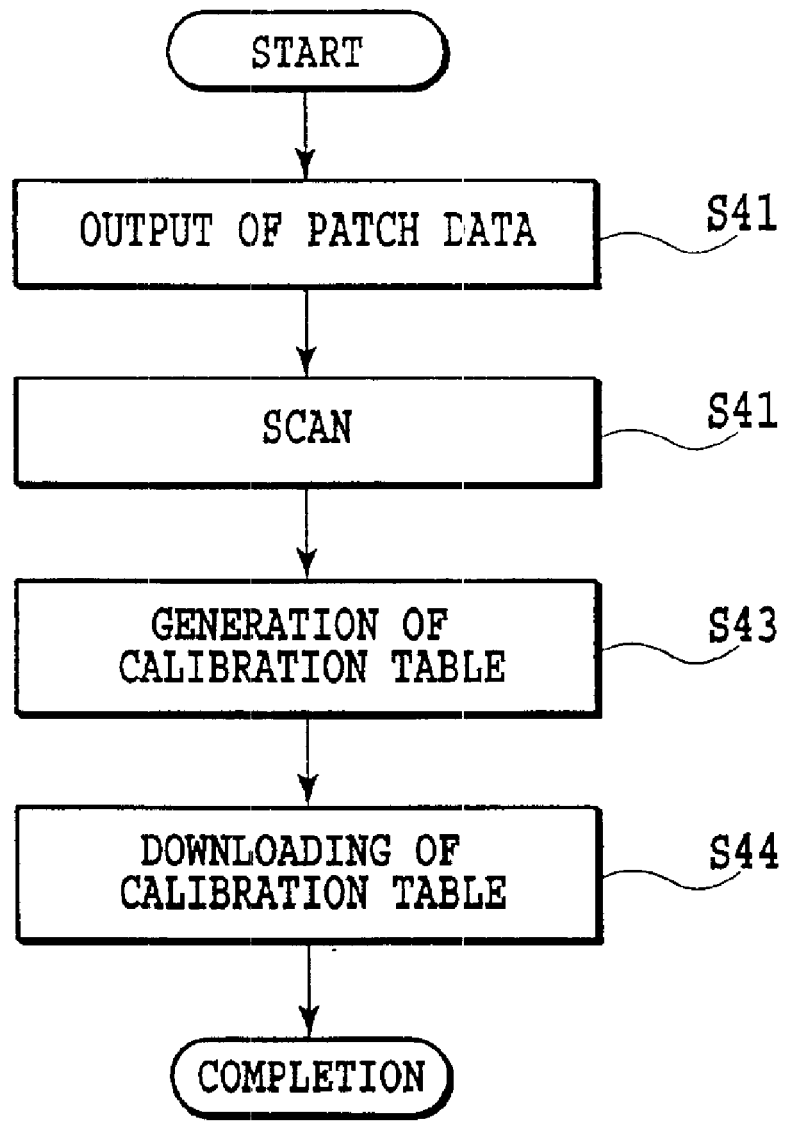
FIG. 7 is a flow chart showing a basic process of a printer calibration according to an embodiment of the present invention.

The calibration for the printer 2 in this embodiment is basically the same as the process shown in FIG. 7 of the first embodiment. The difference is that the brightness-density conversion table used for patch reading at step S42 in FIG. 7 is the brightness-density conversion table stored in the scanner calibration data storing section 1911 in this embodiment.

Figure 20:
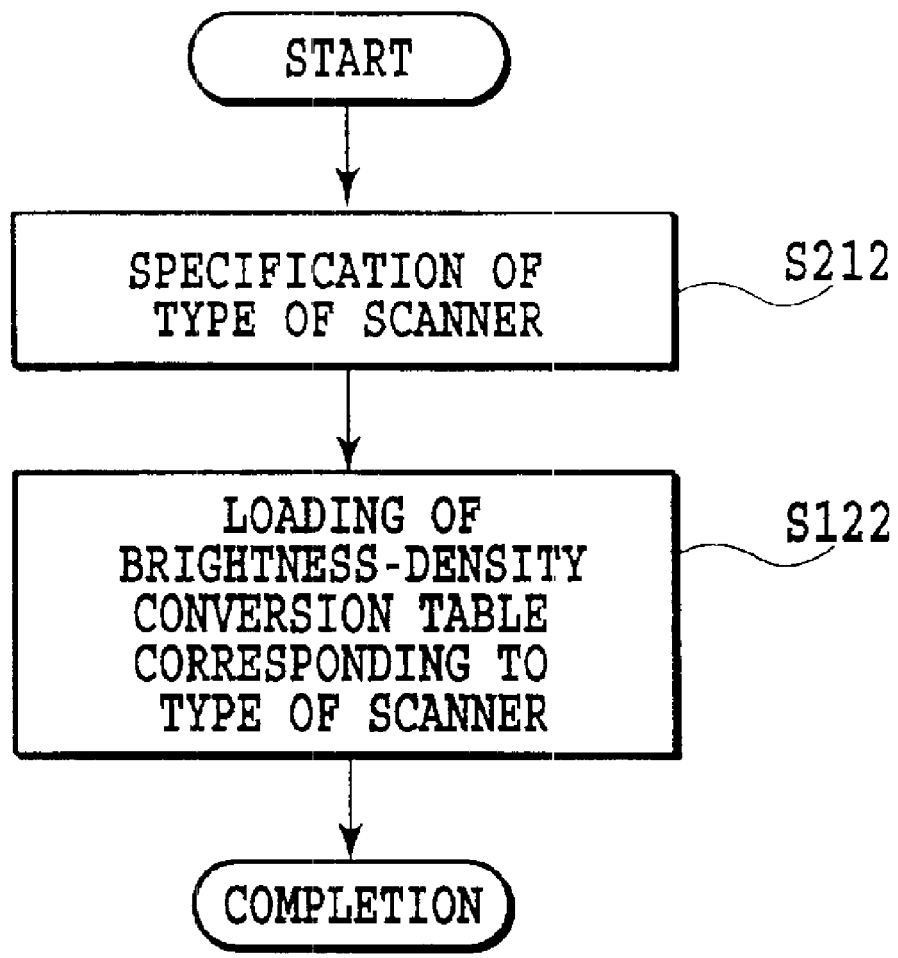
FIG. 20 is a flow chart showing a download process of a brightness-density conversion table which is data for a scanner calibration in the fourth embodiment.

FIG. 20 is a flow chart showing a sequence of a process of downloading the brightness-density conversion table in accordance with the type of scanner.

At step S121 the type of scanner connected to the server PC 1 at that time is specified. This specification process is made possible by exchanging of commands between the server PC 1 and the scanner 3 connected to the server PC 1, or the giving and receiving of hardware-like signals, and others, but the detail thereof will not be mentioned here.

Then at step S122 the brightness-density conversion table in accordance with the type of scanner specified as above is read from the storing section shown in FIG. 19 and is downloaded.

Thus by preparing in advance the scanner calibration data for the type of scanners which may be used, and in the process of patch reading on the printer calibration by downloading the scanner calibration data corresponding to the scanner for doing the reading and thereby executing the brightness-density conversion. Thereby, it becomes possible to performing reading of the patch where correct reflecting of the patch density can be realized, and to shorten the time required for the scanner calibration process.

Although in the fourth embodiment scanner calibration data is prepared for each type of scanners, this is not the only possibility of the present invention; it is possible to prepare the scanner calibration data for each individual scanner of the same type, for instance.

<Fifth Embodiment>

In this embodiment, the scanner itself possesses the scanner calibration data storing section. Then the calibration data stored in the storing section may be generated each time the printer is calibrated as in the first to third embodiments, or may be obtained and stored in advance as in the fourth embodiment.

Figure 21:
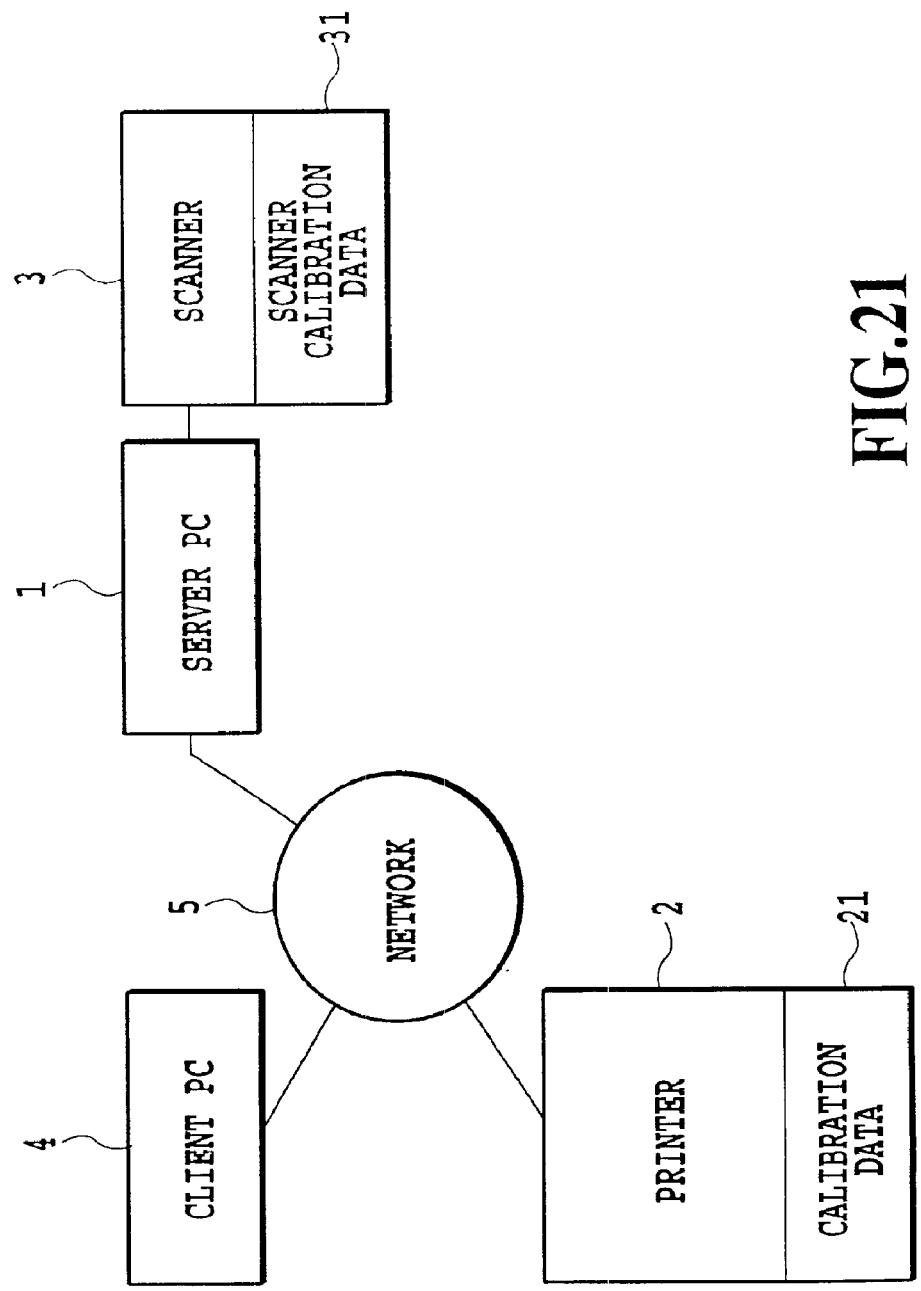
FIG. 21 is a block diagram showing a configuration of a print system according to a fifth embodiment of the present invention.

FIG. 21 is a block diagram showing a configuration of a print system according to this embodiment. The system in this embodiment is constituted basically the same as the system shown in FIG. 1 of the first embodiment; the difference is that the scanner 3 stores the scanner calibration data in this embodiment.

In this embodiment too, under control of the server PC 1, the printer 2 is calibrated by the same procedure described as to FIG. 7. The difference is that when the patch is read at step S42, the scanner calibration data is loaded from the storing section 31 of the scanner 3 in this embodiment.

Figure 22:
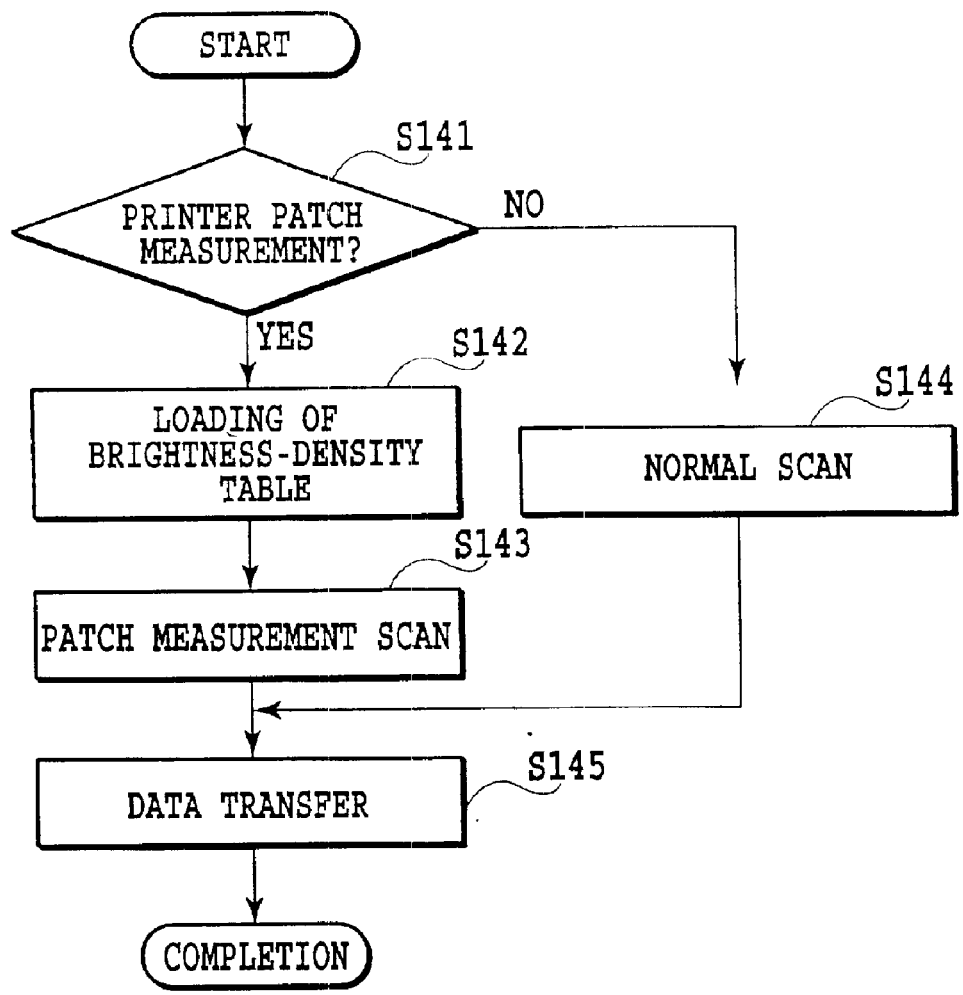
FIG. 22 is a flow chart showing a scan process in the fifth embodiment.

FIG. 22 is a flow chart showing the processes related to the above difference. First at step S141 a judgment is made as to whether the scan is a scan for measuring patch density for the purpose of the printer calibration or not. This judgment can be made based on information such as a command parameter for giving an instruction to execute the scan from the server PC 1, and others, but the detailed description thereof will not be mentioned here.

At step S141 when the scan is judged not to be a scan for measuring a patch, at step S144 usual scan is carried out, and then at step S145 the reading data is transferred to the PC 1. At step S141 when the scan is judged to be the scan for measuring a patch, at step S142 the scanner calibration data is loaded from the storing section 31 of the scanner 3, and then at step S143 the scan for measuring the patch is carried out using the brightness-density conversion table. Then the data read by this scan is transferred to the PC 1.

According to this embodiment, since the scanner calibration data is stored in the scanner connected to the system, it is possible to omit such processes as the specification of the scanner when the reading is executed.

Although the processes related to the calibration such as the generation of the calibration data are executed by the server PC in the above-described embodiments, it is possible to have the applications operate in the client PC and to have the PC execute the processes.

And although in the above-described embodiments the calibration table generated in the server PC is transferred to the printer and is used in an image processing of the printer, this is not the only possibility of the present invention. For instance, in the case of a host apparatus such as a server PC generating binarized bit map data, the host apparatus may store a calibration table, for example, a γ table which is calibrated.

<Other Embodiment>

The present invention may be applied to a system consisting of a plurality of devices (such as a host computer, an interface device, a reader and a printer) or to single device (such as a copying machine and a facsimile).

The present invention also includes a configuration in which a computer in an apparatus or system, which is connected with a variety of devices so as to realize functions of the foregoing examples shown in FIGS. 2, 3, 11–13, 15, 20 and 22, is loaded with a program code of software and in which these devices are operated according to the program stored in the computer (CPU or MPU).

In this case, the software program code itself realizes the functions of these examples. The program code and a means for loading the program code to the computer, such as a storage medium containing a program code, constitute the present invention.

The storage media for storing the program code include floppy disk, hard disk, optical disk, magnetooptical disk, CD-ROM, magnetic tape, nonvolatile memory card and ROM.

The program code is included in the present invention not only when the functions of the aforementioned examples are realized by executing the program code loaded into the computer, but also when these functions are realized by the program code in cooperation with an OS (operating system) or application software running on the computer.

It is needless to say that the present invention further includes a configuration in which the program code is stored in a memory mounted on a computer's function extension board or a function extension unit connected to the computer and the CPU in the function extension board or unit executes a part or all of the actual processing according to the instructions of the program code to realize the functions of the preceding examples.

What is claimed is:

1. An image processing method of generating a conversion condition for a scanner which is used for reading an image and generating image data, said method comprising the steps of:

obtaining a reading property of an object scanner based on image data read from a chart by the object scanner; and generating the conversion condition for the object scanner based on the reading property of the object scanner, a previously prepared reading property of a standard scanner, and a previously prepared brightness-density conversion condition for the standard scanner, wherein said generating step combines an inverse function of an input level-brightness conversion property of the object scanner, an input level-brightness conversion property of the standard scanner, and the brightness-density conversion condition of the standard scanner so as to generate the conversion condition for converting an input level in the object scanner to density data in the standard scanner.

2. An image processing method as claimed in claim 1 further comprising the steps of:

inputting image data read from the chart formed by image forming means;

converting the input image data to density data by using the conversion condition generated; and calibrating a correction condition for the image forming means based on the density data.

3. An image processing method as claimed in claim 1, further comprising the step of:

informing a user that the reading property is inappropriate when the reading property obtained by said obtaining step is inappropriate for generation of the conversion condition in said generating step.

4. An image processing method as claimed in claim 3, further comprising the step of:

displaying the reading property obtained by said obtaining step by means of a predetermined display device.

5. An image processing method of generating a correction condition for a scanner used when calibrating a correction condition for image forming means; said method comprising the steps of:

holding a correction condition for a standard scanner;

judging as to whether the scanner used for calibration is the standard scanner or not;

executing generation of the correction condition for the scanner when the scanner is not judged to be the standard scanner; and not executing generation of the correction condition for the scanner when the scanner is judged to be the standard scanner.

6. An image processing apparatus for generating a conversion condition for a scanner which is used for reading an image and generating image data, said apparatus comprising:

means for obtaining a reading property of an object scanner based on image data read from a chart by the object scanner; and generating means for generating the conversion condition for the object scanner based on the reading property of the object scanner, a previously prepared reading property of a standard scanner, and a previously prepared brightness-density conversion condition for the standard scanner, wherein said generating means combines an inverse function of an input level-brightness conversion property of the object scanner, an input level-brightness conversion property of the standard scanner, and the brightness-density conversion condition of the standard scanner so as to generate the conversion condition for converting an input level in the object scanner to density data in the standard scanner.

7. An image processing apparatus as claimed in claim 6, further comprising:

means for informing a user of that the reading property is inappropriate when the reading property is inappropriate for generation of the conversion condition by said generating means.

8. An image processing apparatus as claimed in claim 7, further comprising:

display means for displaying the reading property.

9. An image processing apparatus comprising:

generating means for generating a correction condition for a scanner used when calibrating a correction condition for image forming means;

holding means for holding a correction condition for a standard scanner; and judging means for judging as to whether the scanner used for calibration is the standard scanner or not;

wherein said generating means executes generation of the correction condition for the scanner when the scanner is not judged to be the standard scanner, and said generating means does not execute generation of the correction condition for the scanner when the scanner is judged to be the standard scanner.

10. A storage medium storing a program readably by a computer, the program being for realizing an image processing method of generating a conversion condition for a scanner which is used for reading an image and generating image data, said method comprising the steps of:

obtaining a reading property of an object scanner based on image data read from a chart by the object scanner; and generating the conversion condition for the object scanner based on the reading property of the object scanner, a previously prepared reading property of a standard scanner, and a previously prepared brightness-density conversion condition for the standard scanner, wherein said generating step combines an inverse function of an input level-brightness conversion property of the object scanner, an input level-brightness conversion property of the standard scanner, and the brightness-density conversion condition of the standard scanner so as to generate the conversion condition for converting an input level in the object scanner to density data in the standard scanner.

11. A storage medium storing a program readably by a computer, the program being for realizing an image processing method of generating a correction condition for a scanner used when calibrating a correction condition for image forming means; said method comprising the steps of:

holding a correction condition for a standard scanner;

judging as to whether the scanner used for calibration is the standard scanner or not;

executing generation of the correction condition for the scanner when the scanner is not judged to be the standard scanner; and not executing generation of the correction condition for the scanner when the scanner is judged to be the standard scanner.

12. A calibration method of performing a calibration for a printing apparatus, said method comprising the steps of:

preparing a reading device for reading a predetermined image printed by the printing apparatus;

executing the calibration by renewing brightness-density conversion data obtained based on a reading property of the reading device, a previously prepared predetermined reading property and a previously prepared brightness-density conversion condition corresponding to the predetermined reading property; and measuring density of the predetermined image by means of the reading device which has been subject to calibration by said calibration step; and generating calibration data for the calibration for the printing apparatus based on a result of measurement in said measuring step, wherein said executing calibration step combines an inverse function of an input level-brightness conversion property of the reading device, an input level-brightness conversion property as determined by the reading property, and the brightness-density conversion condition corresponding to the predetermined reading property, so as to renew the brightness-density conversion data.

13. A calibration method as claimed in claim 12, wherein renewing brightness-density conversion data is performed by selecting brightness-density conversion data corresponding to the reading device relating to the calibration from a previously prepared plurality of brightness-density conversion data.

14. An information processing apparatus for performing a calibration for a printing apparatus, said apparatus comprising:

reading control means for controlling a reading device for reading a predetermined image printed by the printing apparatus;

executing means for executing the calibration by renewing brightness-density conversion data obtained based on a reading property of the reading device, a previously prepared predetermined reading property and a previously prepared brightness-density conversion condition corresponding to the predetermined reading property; and generating means for generating calibration data for the calibration for the printing apparatus based on a density measurement result measured by, under the control of said reading control means, the reading device which has been subject to calibration by said executing means, wherein said generating means combines an inverse function of an input level-brightness conversion property of the object scanner, an input level-brightness conversion property of the standard scanner, and the brightness-density conversion condition of the standard scanner so as to generate the conversion condition for converting an input level in the object scanner to density data in the standard scanner.

15. An information processing apparatus as claimed in claim 14, wherein said executing means renews brightness-density conversion data by selecting brightness-density conversion data corresponding to the reading device relating to the calibration from a previously prepared plurality of brightness-density conversion data.

* * * * *

UNITED STATES PATENT AND TRADEMARK OFFICE
CERTIFICATE OF CORRECTION

PATENT NO. : 6,909,814 B1
DATED : June 21, 2005
INVENTOR(S) : Nobuyuki Nakajima

It is certified that error appears in the above-identified patent and that said Letters Patent is hereby corrected as shown below:

Column 5,
Line 33, "made" should be deleted; and
Line 49, "toread" should read -- to read --.

Column 6,
Line 5, "an" should read -- a --.

Column 8,
Line 47, "detail" should read -- more detailed --.

Column 11,
Line 42, "different" should read -- is different --.

Column 12,
Line 47, "is" should read -- are --.

Column 14,
Line 1, "and thereby executing" should read -- , --.
Line 2, "conversion" should read -- conversion can be executed --.

Signed and Sealed this

Twenty-fifth Day of October, 2005

JON W. DUDAS
*Director of the United States Patent and Trademark Office*